(12) United States Patent
Mishra et al.

(10) Patent No.: US 7,873,549 B1
(45) Date of Patent: Jan. 18, 2011

(54) PRODUCT DIMENSION CORRECTION

(75) Inventors: Devesh Mishra, Issaquah, WA (US); Mackenzie Smith, Issaquah, WA (US); Hong Tian, Seattle, WA (US); Felix F. Antony, Issaquah, WA (US)

(73) Assignee: Amazon Technologies, Inc., Reno, NV (US)

(*) Notice: Subject to any disclaimer, the term of this patent is extended or adjusted under 35 U.S.C. 154(b) by 938 days.

(21) Appl. No.: 11/693,456

(22) Filed: Mar. 29, 2007

Related U.S. Application Data

(63) Continuation-in-part of application No. 11/390,430, filed on Mar. 27, 2006.

(51) Int. Cl.
*G06Q 10/00* (2006.01)

(52) U.S. Cl. ..................................................... 705/28

(58) Field of Classification Search ................... None
See application file for complete search history.

(56) References Cited

U.S. PATENT DOCUMENTS

| 5,430,831 A | * | 7/1995 | Snellen ....................... 700/217 |
| 2002/0007618 A1 | * | 1/2002 | Armington et al. ............ 53/472 |

OTHER PUBLICATIONS

Jacopo Cappellato; "[OFBiz] [JIRA] Commented: (OFBIZ-669) Shipping Box Size Calculation for Better Estimates;" Website; JIRA; Jan. 16, 2006 12:36:45; http://lists.ofbiz.org/pipermail/jira/2006-January/002451.html.
Jacopo Cappellato; "[OFBiz] [JIRA] Commented: (OFBIZ-669) Shipping Box Size Calculation for Better Estimates;" Website; JIRA; Jan. 16, 2006 17:56:44; http://lists.ofbiz.org/pipermail/jira/2006-January/002428.html.
U.S. Appl. No. 11/390,430, filed Mar. 27, 2006.
U.S. Appl. No. 10/827,614, filed Apr. 19, 2004.

\* cited by examiner

*Primary Examiner*—F. Ryan Zeender
*Assistant Examiner*—Paul Danneman
(74) *Attorney, Agent, or Firm*—Robert C. Kowert; Meyertons, Hood, Kivlin, Kowert & Goetzel, P.C.

(57) ABSTRACT

A computer-implemented method for automatically correcting item dimension values may facilitate operations of a materials handling facility. Such a method may include recommending a container for handling one or more items dependent on currently stored item dimension values and determining if any of the item values are inaccurate dependent on an actual container used to handle the one or more items. In some embodiments, the method may include calculating a volumetric utilization of an actual and a recommended container and comparing the two utilizations to determine if the recommended container was too large or too small. If the recommended container was too large or too small, the method may include flagging one or more of the items for measurement and/or correcting item dimensions for one or more of the items. Items may be flagged for measurement in response to a single mismatch between recommended and actual containers or multiple mismatches.

47 Claims, 7 Drawing Sheets

PRODUCT DIMENSION CORRECTION

This application is a continuation-in-part of U.S. application Ser. No. 11/390,430 filed Mar. 27, 2006, titled "Product Dimension Learning Estimator", inventor Felix F. Antony, and which is herein incorporated by reference in its entirety.

BACKGROUND OF THE INVENTION

1. Field of the Invention

This invention relates to materials handling systems and more specifically to correcting dimension values of one or more items therein.

2. Description of the Related Art

Many companies package groups of items together for a variety of purposes, such as e-commerce and mail-order companies that package items (e.g., books, CDs, apparel, food, etc.) to be shipped to fulfill orders from customers. Retailers, wholesalers, and other product distributors (which may collectively be referred to as distributors) typically maintain an inventory of various items that may be ordered by clients or customers. This inventory may be maintained and processed at a materials handling facility which may include, but is not limited to, one or more of: warehouses, distribution centers, cross-docking facilities, order fulfillment facilities, packaging facilities, shipping facilities, or other facilities or combinations of facilities for performing one or more functions of material (inventory) handling. Selecting inappropriate containers in which to package items may increase costs, in terms of container costs, shipping costs, and/or item damage.

Packaging of groups of items may be made more space-efficient when an appropriately sized container is selected based on the total dimensions of the group of items. However, the packing agent may not know the dimensions of each of the items in a group. An agent may instead select a container based on a visual assessment of the items once they are grouped. Using this method, the agent may not be able to select an appropriate container until all of the items in the group have been collected.

A common concern with such groups of items, referred to herein as "item packages," involves ensuring that appropriate containers are used for shipping them, both to minimize costs and to protect the item contents. The visual method described above may be prone to human error, as an agent may select a container that is too small or that is larger than it needs to be to handle the items. This may result in higher costs associated with using an inappropriate container or in additional costs associated with re-work, in the case that an agent must re-package the items. For example, shipping a group of items in a box that is larger than necessary may result in a higher shipping cost than shipping the same items in a smaller box, due to the cost of the box and/or any higher fees associated with shipping larger or heavier boxes. Similarly, shipping items in a box that is larger than necessary, or not filling each box to capacity, may waste valuable (and expensive) transportation space (e.g., space in a truck or in a shipping container that will be placed on a train or an airplane). In another example, attempting to pack an item in a box that is too small for the item may damage the item and/or may result in re-work if the item (or a group of items that include the item) must be taken out of one box and re-packaged in another (larger) box. Determining appropriate containers for handling items in a materials handling facility is difficult if the sizes of all of the items are not precisely known.

Ensuring appropriate handling of items is made even more difficult in situations in which a company has a very large number of diverse items that may be included in package contents, when the available items can frequently change (e.g., to add new items that become available, as well as to remove discontinued items or items that are otherwise unavailable), when some or all of the available items are provided by third parties (e.g., third-party sellers), and when the items themselves may change over time (e.g., due to a change in the packaging of a particular item and/or changes in the item itself).

One technique that may be used to determine the total dimensions of a group of items is to determine the actual dimensions of each of the items and to mathematically combine them. Vendors of particular items may provide the dimensions of those items when they are shipped to a materials handling facility or may provide this information in a catalog of their products. However, the dimensions provided by a vendor may not be accurate. Therefore, it is common to manually measure items in the materials handling facility as they are received or picked for packing. This results in increased costs and opportunities for human error. Scanning devices, such as a CubiScan™ machine, may be used to measure each item, but these require labor on the part of an agent, again adding costs and further opportunities for error.

SUMMARY

Various embodiments of a system and method for correcting item dimension values associated with one or more items in a materials handling facility are disclosed. In one embodiment, the methods may be implemented by a computing system that includes a memory configured to store item dimension values of the one or more items and program instructions for implementing a product dimension correction system.

A product dimension correction system may be configured to provide or receive an indicator of a container recommended to collectively handle the one or more items dependent on the stored item dimension values. In some embodiments, the product dimension correction system may be configured to receive an indication of an actual container in which the one or more items were handled, to compare the actual container to the recommended container, and to determine a reason that the items were not handled in the recommended container if the comparison indicates that the items were not handled in the recommended container. Comparing the actual container to the recommended container may involve comparing an identifier of each of the containers to see if they match or calculating and comparing a volumetric utilization of the items within each of the containers to see if they match, in different embodiments.

If the items were not handled in the recommended container because the recommended container was not appropriately sized (e.g., because the recommended container was too small or larger than necessary to handle the items), the product dimension correction system may be configured to correct at least one item dimension value stored in the memory. The memory may also be configured to store container dimension values of various containers used in the materials handling facility, and to use these container dimension values when recommending a container for handling a group of items and/or when determining if the recommended container is smaller than, larger than, or equal to the actual container used to handle the group of items.

In some embodiments, the product dimension correction system may be configured to determine a reason why a recommended container was not used dependent on feedback received from an agent or an automated operation indicating that the recommended container was too small to handle the items, that the recommended container was larger than necessary to handle the items, or that the recommended container was not available for handling the items.

In order to correct the item dimension values of one or more items, the product dimension correction system may be further configured to initiate a measurement of at least one of the items and to compare the measured item dimensions to the item dimension values associated with the item and stored in the memory. If the measured dimensions are different from the stored item dimension values, the stored item dimension values and/or a confidence level associated with the item dimension values may be updated in the memory. In some embodiments, measurement of an item may be initiated in response to an item package that includes the item being packaged in an actual container that is different from a recommended container. In other embodiments, measurement of an item may not be initiated until the item has been included in two or more item packages that were packaged in actual containers that were different from recommended containers.

A product dimension correction system, as described herein, may be used to validate, correct, and/or update item dimension values previously measured for an item or item dimension values provided by a manufacturer or supplier of the items in a materials handling facility. In some embodiments, item dimension values associated with items that have recently been measured and/or that are supplied by a vendor that has historically supplied accurate item dimension values may be considered to be trusted item dimension values and may be given a lower priority for being measured when a packaging incongruity is detected.

The product dimension correction system described herein may be implemented in one or more software modules executing on one or more nodes of a computing system (e.g., as program instructions and data structures configured to implement functionality described), or in any combination of hardware and software components suitable for implementing the functionality described.

Figure 1:
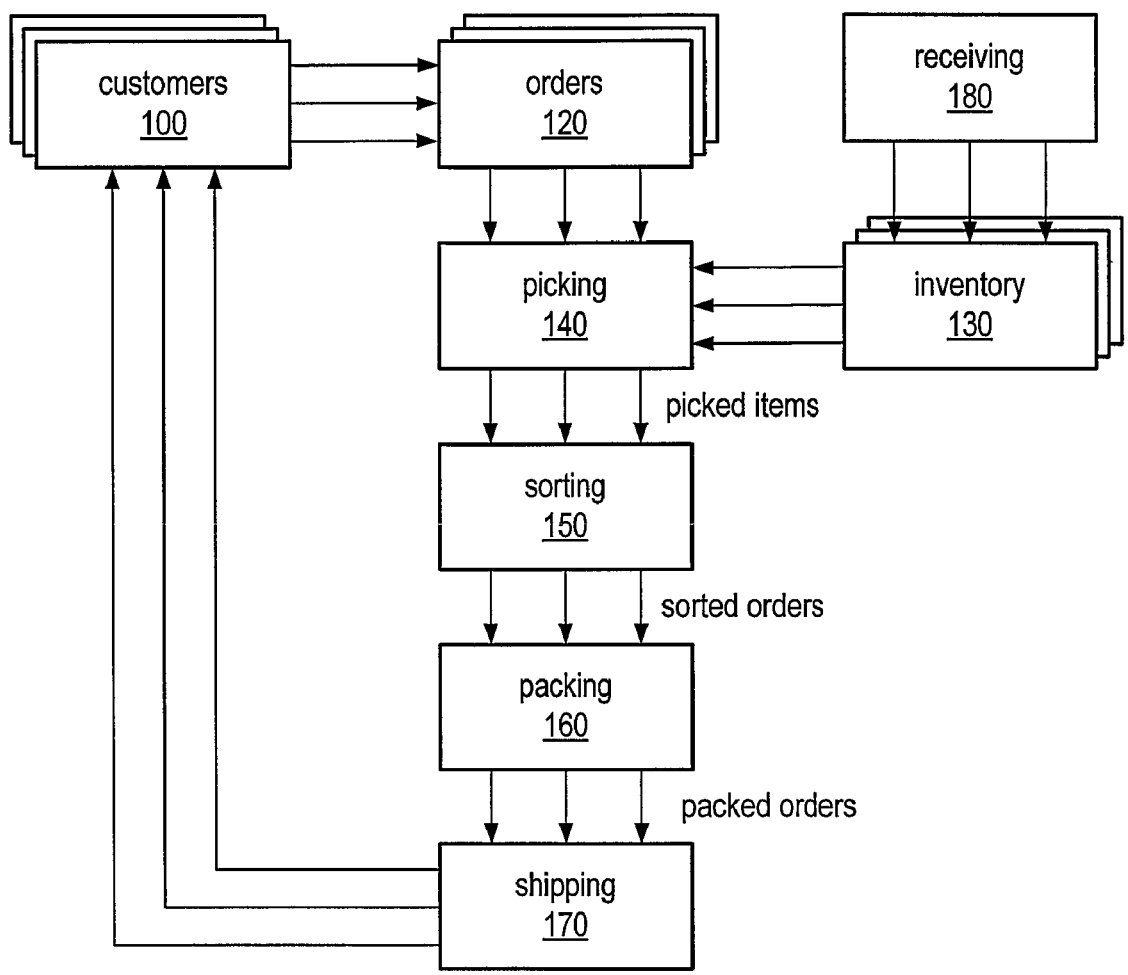
FIG. 1 illustrates a broad view of the operation of a materials handling facility, in one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Introduction

Various systems and methods for correcting item dimension values for one or more items in a materials handling facility are disclosed. In some embodiments, such a method may be used to optimize selection of an appropriate container in which to store, convey, or ship an item or group of items from among available containers of different sizes, shapes, and/or materials. The system may operate in environments in which the items that are available frequently change and/or in which available items themselves can change, with the system automatically adapting to such changes, in various embodiments. For example, item dimension values for a given item may need to be corrected if item dimension values received from a vendor of the item were inaccurate, or if an item changes subsequent to its dimension values being stored within the system (e.g., its packaging may have changed or the item itself may have changed shapes or sizes).

In particular, in some embodiments, a computer-implemented method may automatically determine that item dimension values for one or more items are not accurate and may correct them, or facilitate their correction. Correcting inaccurate item dimension values using such a method may, in some embodiments, facilitate efficiency and cost-effectiveness in various operations of a materials handling facility.

As used herein, "item packages" may refer to items grouped for shipping to a customer or items grouped for any other operation within a materials handling facility, such as for storing in inventory or transporting to a packing or shipping station. In various embodiments, "containers" may include pallets, crates, cases, bins, boxes, carts, totes, conveyor belts, shelves, cabinets, or any other apparatus capable of storing, conveying or shipping one or more items.

In some embodiments, the system may be configured to recommend various containers suitable for shipping one or more items or for storing or conveying one or more items in the materials handling facility, dependent on item dimension values currently associated with the items. For example, the system may recommend a particular box type and/or size suitable for shipping a group of items associated with a customer order based on the item dimension values provided by the vendor of each of the items in the group and the dimensions of the boxes available for shipping.

In some embodiments, an automated product dimension correction system may be used to identify incongruous item packages whose dimensions do not correspond to the currently associated item dimension values for the items in the package. For example, if a group of items fits in a container significantly smaller than a container recommended by the system, this may indicate that currently stored item dimension values of one or more items included in the container are not accurate. In such cases, the product dimension correction system may recommend that one or more of the items be measured, or may initiate a measurement of one or more of the items. The results of the measurement(s) may then be automatically incorporated by the system in an appropriate manner, such as by updating item dimension values to reflect one or more actual dimension values from the measurement (e.g., by replacing an initial item dimension value with a measured item dimension value, by adjusting a range of allowable values for an item dimension, by adjusting the confidence level or uncertainty level associated with an item dimension value, etc.).

The product dimension correction system may be used to detect that the item dimensions supplied by a vendor are inaccurate or that the size or shape of an item has changed, in some embodiments. For example, if one or more items fit best in a container different than a recommended container, this may indicate that the stored dimension values of the item are inaccurate. In some cases, this may indicate that the initial value for one or more item dimensions of one or more of the items, such as a value supplied by a vendor, was significantly different than the actual dimension value of the item. In still other cases, this may indicate that the actual dimensions of one or more of the items has changed, such as if one of the items has been packaged differently by the vendor or the dimensions of the item itself have changed. In some embodiments, measurements of one or more items of these item packages may be performed to determine the cause of each identified incongruity. In other embodiments, the product dimension correction system may continue to gather information about the items in the item package in order to determine if there is an inaccuracy in one or more item dimension values and if this inaccuracy is due to a change or a poor input, or if it is a statistical outlier (e.g., a single instance of a defective item or item identifier.)

In one example, a product dimension correction system may be used as part of a distribution operation for an organization that ships large numbers of item packages to customers. In this example, the organization may maintain information about each of the items that is available to be shipped, but that item information may not include precise and accurate dimension values for all of the items. When the system has sufficient dimension information for the items intended to be the contents of an item package (e.g., if any item dimension information is currently associated with the items in the item package), the system may then anticipate the total dimensions of the item package based on those item dimensions and on the dimensions of any non-item contents of the package (e.g., air bags or foam used as padding or filler, promotional inserts from the organization, etc).

In some embodiments, the item dimension values may be used to identify containers whose volume and/or dimensions are appropriate for handling one or more items (e.g., to identify containers for storing, conveying or shipping groups of items, or to determine if an item or group of items can pass through a particular portal or be conveyed using a particular dimensionally-constrained path.) In addition, in some embodiments the dimension values and/or volume of the packaging materials and any other non-item contents may also be considered when recommending a container for the item package. For example, the container dimension values and dimension values for promotional inserts and/or fill materials may be supplied to the facility as an input and may be used in determining an appropriate container and/or in detecting any incongruities in container selection and use.

In one embodiment, the volume of an item may be defined to be equal to the volume of a three-dimensional bounding box having length, width, and height equal to the length, width, and height of the item, and the volume of a container may be defined to be the maximum volume of the interior of the container. In some embodiments, the volume and dimensions of a group of items may be defined, respectively, to be the volume and corresponding dimensions of a three-dimensional bounding box having sufficient length, width, and height to contain all of the items in the group at the same time. For example, in one embodiment, a container recommendation may be determined using a particular packing algorithm that calculates the volume of such a bounding box according to guidelines and conventions for packing one or more items (e.g., the packing algorithm may specify that the largest and/or heaviest item should be placed horizontally on bottom of the container first and additional items may be placed on top of, or next to, this item in order of their largest dimension value, their weight, etc.) In another embodiment, the system may be configured to calculate a volumetric utilization (e.g., the percentage of the container that would be filled by the items and any non-item contents) for the items when placed in containers of various sizes and shapes. The system may then recommend a container dependent on maximizing the volumetric utilization. While the examples contained herein use the definitions described above, other embodiments may use other definitions of volume and/or volumetric utilization, or may not use a determination of volume or volumetric utilization as part of product dimension correction.

In some embodiments, the product dimension correction system may consider additional factors when identifying inaccurate item dimension values. For example, values for dimensions may vary for at least some items and packaging materials based on factors such as current temperature, humidity, altitude, etc. In addition, when a particular item or type of packaging material may be supplied from multiple suppliers, the item dimension values for those items may be adjusted as appropriate based on the supplier if variations based on the supplier occur. More generally, a variety of techniques may be employed to track a variety of environmental and other relevant factors corresponding to items and packaging materials in order to determine which of the factors has a possible causal or correlative effect on the values of the item dimensions, and item dimension values for those items may then be adjusted to reflect those factors, such as automatically and in a real-time manner, according to various embodiments. For example, the system may consider a minimum, typical, or maximum allowed item dimension value of a given item when recommending a container for an item package, dependent on the environmental factors or vendor. The product dimension correction system may consider any values within this range of values for the particular item dimension to be "correct," in some embodiments, or may correct the allowed range of values if it is determined to be inaccurate and/or unsuitable for use in recommending containers for item packages that include the given item.

For illustrative purposes, some embodiments of product dimension correction are discussed below in which particular item and container parameters are analyzed in particular manners, and in which particular types of analyses and processing of parameters is performed. However, those skilled in the art will appreciate that the techniques described may be used in a wide variety of other situations, and that the invention is not limited to the details of these example embodiments.

An exemplary block diagram of a materials handling facility, which, in one embodiment, may be an order fulfillment facility configured to utilize product dimension correction as described herein, is illustrated in FIG. 1. In this example, multiple customers 100 may submit orders 120 to a distributor, where each order 120 specifies one or more items from inventory 130 to be shipped to the customer or to another entity specified in the order. An order fulfillment facility typically includes a receiving operation 180 for receiving shipments of stock from various vendors and storing the received stock in inventory 130. To fulfill the customer orders 120, the one or more items specified in each order may be retrieved or "picked" from inventory 130 (which may also be referred to as stock storage) in the order fulfillment facility, as indicated by block 140. Picked items may be delivered to one or more stations in the order fulfillment facility for sorting 150 into their respective orders, packing 160, and finally shipping 170 to the customers 100. Note that not every fulfillment facility may include both sorting and packing stations. In certain embodiments agents may transfer picked items directly to a packing station, such as packing station 160, while in other embodiments, agents may transfer picked items to a combination sorting and packing station (not illustrated). This may result in a stream and/or batches of picked items for multiple incomplete or complete orders being delivered to sorting 150 for sorting into their respective orders for packing 160 and shipping 170, according to one embodiment.

Note that portions of an order may be received at different times, so sorting 150 and packing 160 may have to wait for one or more items for some orders to be delivered to the sorting station(s) before completion of processing of the orders. Note that a picked, packed and shipped order does not necessarily include all of the items ordered by the customer; a shipped order may include only a subset of the ordered items available to ship at one time from one inventory-storing location. Also note that the various operations of an order fulfillment facility may be located in one building or facility, or alternatively may be spread or subdivided across two or more buildings or facilities. In various embodiments, items and groups of items may be transported between the stations or operations of the facility in one or more containers, through one or more portals, and/or using one or more dimensionally-constrained paths, as described herein.

Product dimension correction, as described herein in various embodiments, may be utilized in several areas of a materials handling or order fulfillment facility such as during storing in inventory 130, picking 140, sorting 150, packing 160, or shipping 170. For example, if an agent is directed to store an item in a shelf, bin, crate, box, or other container in inventory 130, but it does not fit, the product dimension correction system may detect that one or more item dimension values associated with the item are inaccurate and may initiate correction (e.g., by directing that the item should be measured). Similarly if an agent is directed to transport one or more items within the facility during picking 140, such as in a tote, but the items do not all fit in the tote, the product dimension correction system may detect that one or more item dimension values associated with one or more of the items are inaccurate and may initiate correction. In yet another example, if an item is to be transported through a portal or chute and the item does not fit through the portal or chute, the product dimension correction system may detect that currently stored item dimension values are inaccurate and/or may correct one or more dimension values for the item. The product dimension correction system may use container dimension values of any actual containers, portals, or paths with which the item is handled during storing 130, picking 140, sorting 150, packing 160, or shipping 170 to detect inaccurate item dimension values and/or to correct them, in various embodiments.

In some embodiments, information about the actual containers, portals, or paths used in handling one or more items during the operations described above may be automatically captured as a by-product of normal operation. For example, product dimension correction system may receive or capture an identifier of such a container when an agent places an item in the container, according to various embodiments. Similarly, a product dimension correction system may automatically receive or capture an identifier of an item when it is placed in a container, passed through a portal, or put on a dimensionally-constrained path, in some embodiments. For example, a bar code or Radio Frequency Identification tag (RFID tag) of a container and/or an item may be automatically scanned and the data from the scanner may be automatically stored in one or more tables, databases, or other data structures accessible by the product dimension correction system when the item is placed in the container. In another example, an item may be scanned when it passes through a portal, such as a doorway between two rooms or buildings, or when it is placed in a chute. In some embodiments, items and corresponding containers, portals, or paths may be scanned as part of normal operations when items are stored, picked, transported, or sorted, or when they are placed in a container for shipping. Therefore, in some embodiments, no additional steps may need to be performed to capture identifiers of the items and the containers, portals, or paths used in handling them in the facility. In some embodiments, these identifiers may be associated with one or more entries in tables, databases, or other data structures containing item dimension values currently associated with various containers, portals, paths, and items.

A system configured to implement product dimension correction may, in some embodiments, also be configured to instruct or recommend the selection, from among available containers, of a container in which to place one or more items, or a portal or path through which to convey the items, during the receiving 180, storing in inventory 130, picking 140, sorting 150, packing 160, or shipping 170 operations described above. In some embodiments, the selection of containers that are neither too small nor larger than they need to be may result in more efficient use of space in the facility for storage and other operations, and may also reduce costs associated with floor space, packing materials, or transportation (e.g., shipping). In some embodiments, the product dimension correction system may be used to estimate corresponding dimensions of a container suitable for storing, transporting, or shipping the items that is space-efficient and/or cost effective. In some embodiments, the product dimension correction system may be used to determine if an item or group of items will fit in a given inventory area, will fit through a given portal, such as a doorway, hatch, or gate, or can be transported using a given dimensionally-constrained path, such as a chute, track, pipe, or conveyor belt. In other embodiments, a product dimension correction system may be used to facilitate item picking, such as by directing an agent to select a given item from a particular inventory area based on the relative values of actual (e.g., corrected) dimension values of the items in the inventory area.

Automated product dimension correction, as described herein in various embodiments, may be utilized in a number of different facilities and situations, including, but not limited to materials handling facilities, order fulfillment centers, rental centers, distribution centers, packaging facilities, shipping facilities, libraries, museums, warehouse storage facilities, and the like. Note that the arrangement and order of operations illustrated by FIG. 1 is merely one example of many possible embodiments of the operation of an order fulfillment facility utilizing automated product dimension correction. Other types of materials handling, manufacturing, or order fulfillment facilities may include different, fewer, or additional operations and resources, according to different embodiments.

In some embodiments, a materials handling facility may store different instances of items in different individual inventory areas within inventory 130. Additionally, different items may be stored together in a single inventory area, according to particular embodiments. In some cases, storing different items together may result in more efficient use of total inventory space than using a single inventory area for multiple copies of a single item or product. In other cases it may be beneficial to store similar items together to make better use of inventory space. In some embodiments, such as that illustrated in FIG. 2, an inventory area may include both similar items stored together, such as on one shelf, and different items stored together, such as on another shelf. In this example, storing different compact discs (CDs) together on a single inventory shelf, as shown in inventory area 235b, may use the available inventory space more efficiently than storing one CD among other items of greatly differing size and shape, such electronic devices, clothing, or other items. In some embodiments, a materials handling facility may also store items of similar, but not identical, shape and size together in a single inventory area. For instance, in one embodiment, items such as books, CDs, and digital video discs (DVDs) may all be stored together, as shown in inventory area 235a. In still other embodiments, different items, with different shapes and sizes, may all be stored together. For example, inventory area 235e illustrates clothing and electronic items stored along with books, CDs, etc.

In some embodiments, determining where to store an item may be performed manually, while in other embodiments, it may be an automatic process performed by one or more computer software programs based on the dimensions of the items. In some embodiments, both space utilization and speed of storing may be improved if an agent is directed to store an item in an inventory area, such as a shelf or bin, in which it will easily fit. In some such embodiments, selecting an appropriate inventory area may also reduce damage during the storing operation if items are not forced into shelves or bins that are too small. In some such embodiments, the product dimension correction system may consider the dimensions of an item that needs to be stored, the dimensions of currently stored items, and the dimensions of inventory areas in which items are currently stored when identifying an inventory area with enough remaining free space to hold the item. For example, if a book is to be stored in one of the inventory areas illustrated in FIG. 2, the product dimension correction system may use the dimensions of the book to determine that it is too wide to fit in any remaining spaces of inventory areas 235a, 235b, 235c and 235e, based on the dimensions of the other items stored in those areas. In this example, the product dimension correction system may determine that the book should easily fit in inventory area 235d and may direct an agent to store it in this area. In some embodiments, if the item does not fit in the area recommended by the product dimension correction system, the product dimension correction system may be configured to correct one or more item dimension values currently associated with the item, such as values maintained in a table, database, or other data structure comprising item parameters.

Similarly, for operations other than storing, selecting an appropriate container in which to place one or more items may also increase space utilization and/or reduce damage and costs. For example, selecting an appropriate portal or dimensionally-constrained path through which to convey an item may reduce damage caused by trying to fit an item through a portal that is too small or by trying to place an item in a chute that is too narrow for the item. In another example, being able to accurately determine the size of totes needed for picking groups of items and being able to pack these totes to near capacity, based on having accurate dimension values for the items in the group, may reduce the number of such totes needed, thereby reducing costs.

Figure 2:
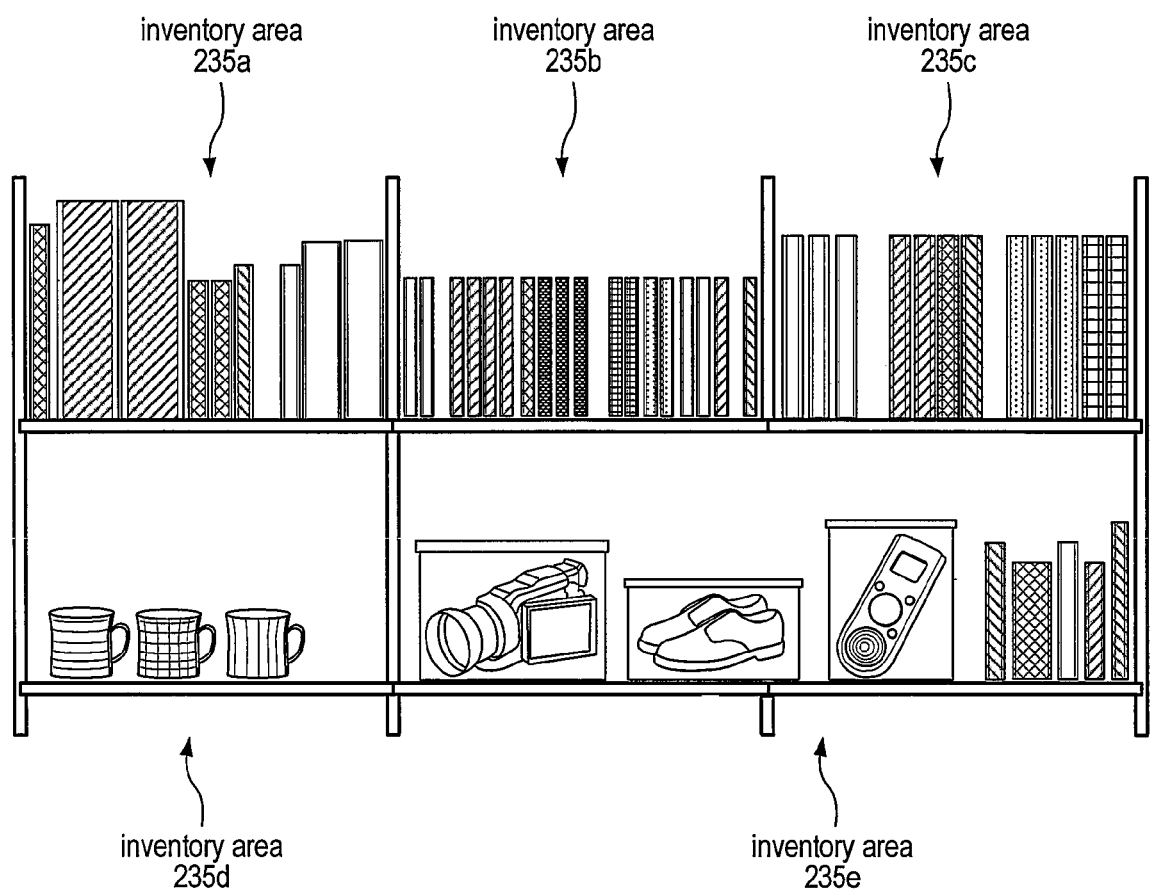
FIG. 2 illustrates various items stored in a multi-shelf inventory area, according to one embodiment.

The items in a materials handling facility may be of varying shapes and sizes, as shown in the exemplary inventory areas illustrated in FIG. 2. In this example, some items in the materials handling facility are irregularly shaped. In some embodiments, irregularly shaped items may be stored in boxes or other regularly shaped packaging, which may facilitate container recommendation, product dimension correction, and/or more efficient storage, such as by making stacking of such items possible. This is illustrated in inventory area 235e. In other embodiments, irregularly shaped items may be stored without placing them in regularly shaped packaging. This is illustrated in inventory area 235d. According to various embodiments, automated product dimension correction may be utilized with any regularly shaped or irregularly shaped items.

As previously noted, product dimensions may be used to facilitate item identification for picking, in some embodiments. In such embodiments, the system may be configured to determine, and/or communicate to an agent, a size, shape, or relative size or shape of an item to be picked. For example, in one embodiment, an agent may be directed to select an item from a particular inventory area that is approximately 10 inches tall or 3 inches wide, based on the currently stored values for the height or width of the item. In another embodiment, an agent may be directed to select the "shortest" item or the "thinnest" item in a particular inventory area, based on the relative values of the currently associated dimension values for each of the items in the area. In an example illustrated by FIG. 2, an agent may be directed to select the tallest or widest item in inventory area 235a, either of which would clearly indicate one of two identical items in the area. In some embodiments, the relative shape or size of an item may be combined with other information when directing an agent to identify the item, such as the type or color of the item. For example, an agent may be directed to select the "widest book," the "tall, red book," or the "short, blue box" in inventory area 235e.

In embodiments in which size, shape or relative size and/or shape are used to facilitate the picking operation, the product dimension correction system may be used to detect and/or correct inaccurate item dimension values. For example, if an agent is directed to select the tallest item in a particular area, but the tallest item in the area is not the item that was to be picked, the agent may provide feedback to the product dimension correction system indicating that one or more currently stored item dimension values for the item, or for other items stored in the same area, may be inaccurate.

In some embodiments, the product dimension correction system may make particular assumptions about item dimensions or may assign item dimensions according to a standard algorithm, or company policy, in order to facilitate the recommendation of containers for item packages and/or product dimension correction. For example, in one embodiment, the item dimension having the largest value may be designated to be the "height," the dimension having the second largest value may be designated to be the "length," and the dimension having the smallest value may be designated to be the "width" of the item. In such embodiments, the dimensions of containers may also be designated using the same assumptions. In other embodiments, different assumptions or assignments may be made or the designation of length, height, and width dimensions of items or containers may be arbitrary. In some embodiments, standards or policies may specify other aspects of product dimension correction, such as a default placement or orientation for certain items within containers or a specific bin-packing algorithm to be assumed when recommending containers and/or detecting and correcting item dimension values. For example, a policy may specify that the largest item in a group should be placed horizontally along the bottom of shipping boxes.

Figure 3:
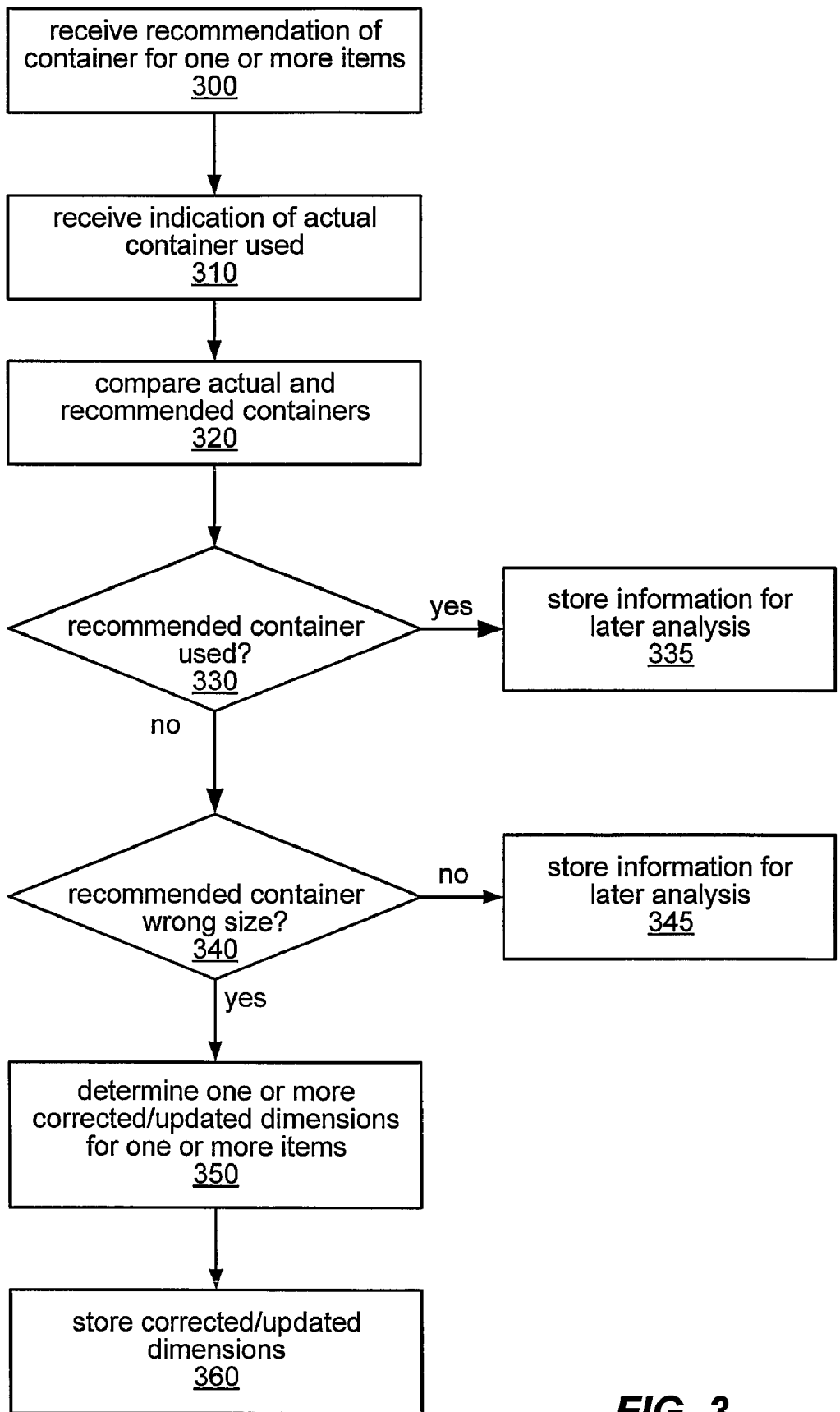
FIG. 3 illustrates a method for detecting and correcting inaccurate item dimensions, according to one embodiment.

One method for performing product dimension correction is illustrated by the flow chart in FIG. 3. In this example, the method may include receiving a recommendation for a container in which to handle an item package that includes one or more items, as in 300. The container may be recommended as a smallest container in which the item package (including the one or more items and/or any non-item contents) may be transported within a materials handling facility or in which the item package may be shipped. The recommendation may be generated by, or received by, a module of a product dimension correction system, as described herein, which may be implemented in any combination of hardware and software within the materials handling facility, in various embodiments. In other embodiments, the recommendation may be received from a remote system that is configured to exchange information with the operations of the materials handling facility. For example, a product dimension correction system may be implemented as a software application executing on a computing system in the materials handling facility and configured to implement recommending a container for an item package. It may be configured to receive inputs from other software applications, agents working in the facility or remotely, and/or automated systems within the facility (e.g., scanners, sensors, automated storing, picking, or packing equipment, or software applications managing one or more local or remote data stores.) In another example, the recommendation may be received from a separate mechanism, such as a container recommender implemented in a combination of hardware and software executing on the same or a different computing system within the materials handling facility or remotely.

An automated product dimension correction system may be configured to recommend a container, portal, or path for handling the item package based on the currently stored volume and/or dimensions of each of the items included in the item package. In some embodiments, the automated product dimension correction system may calculate the overall dimensions of the item package based on the item dimensions of each of the items as well as dimensions of any required non-item contents (if any). In such cases, the product dimension correction system may be configured to recommend a smallest available container in which the grouped items will fit, a portal through which they may pass, or a dimensionally-constrained path on which they may be conveyed based on the calculated overall dimensions. In other embodiments, the product dimension correction system may use a standard or custom bin-packing algorithm to determine, for each available container, whether or not the items will fit in the container. In some embodiments, the product dimension correction system may begin its recommendation process by determining if the items will fit in the smallest available container, or through the smallest portal or path, and if not, repeating its determination for each other container, portal, or path in turn, from smallest to largest, until determining that the items will fit into one of the containers or through one of the portals or paths. In other embodiments, the identification of suitable containers, portals, or paths for handling the package may be performed in other manners. For example, the product dimension correction system may track container, portal, or path types corresponding to those handling various groups of item contents, and may retrieve an indication of one or more appropriate container, portal, or path types for handling the current item contents based on a stored mapping for those contents.

Recommending a container, portal, or path may include displaying an indicator of the container, portal, or path to be used on an input/output device readable by an agent working in the materials handling facility, in some embodiments. In other embodiments, a recommendation for a container, portal, or path may be printed for an agent, such as on a pick list or packing list. In still other embodiments, a machine may be configured to pick and/or present a container (such as a box) to an agent or to an automated packing system based on the recommendation or to automatically transport the items to a portal, path, or packing station (e.g., one handling item packages having a particular range of items dimensions) for further handling. Therefore, receiving a recommendation for a container, as in 300, may include being presented with a printed or displayed recommendation, being presented with a recommended container, or receiving an indication that an item package has been routed to a particular portal, path, or packing station, in different embodiments.

As shown in the example illustrated in FIG. 3, the method may include receiving an indication of a container actually used to handle the item package, as in 310. In some embodiments, if a recommended container, portal, or path is inappropriately sized for handling an item package, an agent or automated mechanism may select a more suitable container, portal, or path for the items and feedback may be sent to the product dimension correction system indicating that a recommended container, portal, or path was not used. This indication may be received from an agent, in some embodiments, or from an automated feedback mechanism of various operations of the materials handling facility. For example, if items and containers are scanned when the items are placed in a container for storage, transport, or shipping (and the scanned information is input to the product dimension correction system), the product dimension correction system may receive an indication of the container in which the item package was actually handled. In some embodiments, a packing system may include a scanner or sensors and software to detect that one or more items are sticking out of a box, that a box will not close, or that a box is half-empty, and may be configured to select a different box for the item package. In other embodiments, an agent of the materials handling facility, such as a picking, sorting or packing agent, may detect that a recommended container is not appropriate for the group of items intended to be placed in it and may provide an indication to the product dimension correction system to that effect and/or that one or more of the item dimension values for those items may be inaccurate. For example, an agent working in the facility may visually detect that one or more items is not completely contained within a recommended box, bin, tote, or shelf, or that a recommended box, bin, tote, or shelf is not filled to near its capacity, and may select a different container for the item package. In yet another example, if an item or group of items is expected to be able to pass through a particular portal or fit through a particular chute based on currently stored item dimension values, but the item or items do not fit, an agent or an automated operation may provide feedback to the product dimension correction system indicating that the items do not fit and/or that one or more of the item-dimension values for those items may be inaccurate.

Figure 5:
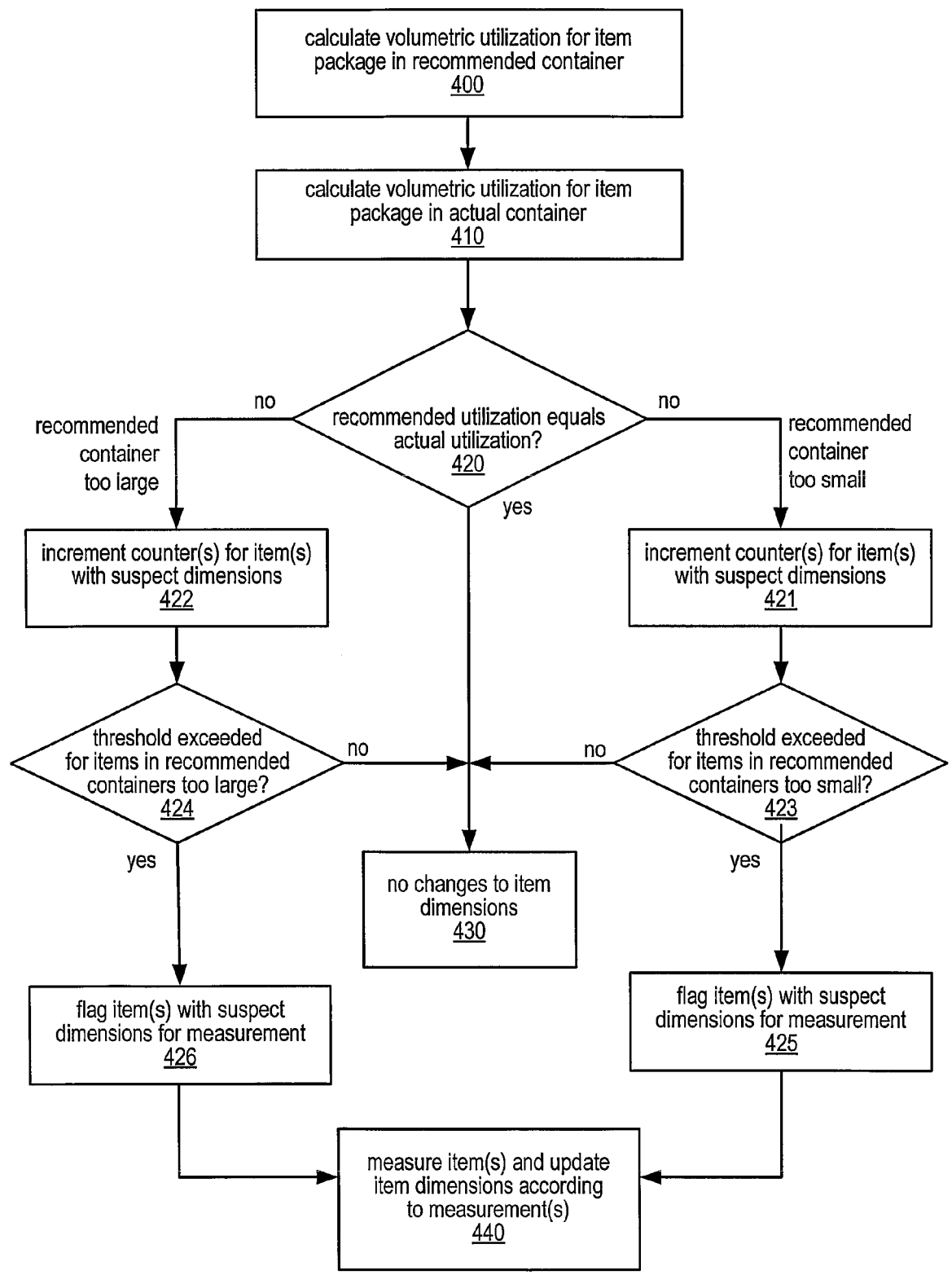
FIG. 5 illustrates a second embodiment of a method for determining and correcting inaccurate dimension information for an item.

As illustrated in FIG. 3, the method may include comparing the recommended container and the actual container used, as in 320. For example, in one embodiment, the product dimension correction system may compare an identifier of the actual container (e.g., one received as feedback from an agent or automated operation) with an identifier of the recommended container to see if they match. Using this comparison, the product dimension correction system may detect that a recommended container was not used and/or that the items were placed in a container smaller or larger than one recommended based on currently stored item dimension values for the items in the item package. Other methods of performing a comparison between an actual and a recommended container are illustrated in FIG. 5 and described below.

If the recommended container was used, shown as the positive exit from 330, the method may include storing an identifier of the recommended container and/or the actual container along with information about the item package for further analysis, as in 335. For example, a performance tracking operation of the materials handling facility may review the number of correctly recommended containers for different item packages and/or for item packages that include particular items in order to detect any issues with the container recommendation process.

If the recommended container was not used, shown as the negative exit from 330, the method may include determining if the recommended container was not appropriately sized, as in 340. For example, in some embodiments, an agent may provide feedback indicating one or more reasons why the recommended container, portal, or path was not used, such as that it was smaller or larger than necessary, or that the recommended container was available. The product dimension correction system may, in some embodiments, incorporate this additional information when updating a value or confidence level for one or more dimension values for one or more of the items in the container. If the recommended container was appropriately sized, shown as the negative exit from 340, the method may include storing an identifier of the recommended container and/or the actual container along with information about the item package for further analysis, as in 345. For example, a performance tracking operation of the materials handling facility may review the number of mismatches between recommended and actual containers for different item packages when the recommended container was appropriately sized to detect any issues with the operations of the materials handling facility (e.g., if not enough boxes of a given size are being supplied to the facility).

An agent may provide feedback to the product dimension correction system in a variety of ways including, but not limited to, by scanning a container used, entering container, portal, or path information through a terminal or other input/output device serving to input data to the product dimension correction system, or pressing one or more buttons, keys, levers, or touch pads to indicate whether or not the recommended container, portal, or path was used and/or the reason, if it was not. In some embodiments, an agent may provide feedback to the product dimension correction system indicating a particular item in an item package is not completely contained within the container, such as if a tall item sticks out of the top of a box or a wide item overhangs the edge of a bin. In such cases, the product dimension correction system may use this information to determine that stored item dimension values for the given item are inaccurate. In other embodiments, the product dimension correction system may determine that a recommended container was too small or larger than necessary by comparing container dimension values of the recommended container and the actual container. A more detailed description of a method for performing a comparison between an actual and a recommended container is illustrated in FIG. 5 and described below.

As illustrated in FIG. 3, the method may include determining that one or more item dimension values for one or more items in an item package are inaccurate and determining correct values for those dimensions, as in 350. For example, a product dimension correction system may determine that item dimension values are inaccurate based on feedback received from various agents of the facility or from automated feedback mechanisms, and/or based on an analysis of information collected for one or more incidences of a mismatch between a recommended container and an actual container. If one or more item dimension values are determined to be inaccurate, the method may include measuring one or more items in the item package to obtain accurate item dimension values and comparing these values to currently stored item dimension values. For example, a product dimension correction system may be configured to recommend measuring one or more items, to automatically cause the item(s) to be measured (e.g., by sending instructions to automated picking and/or dispatching equipment to transport the items to a measurement station), or to place one or more item identifiers on a list of items to be picked and measured by agents in the facility (e.g., a list of items to be measured overnight based on incongruities detected during the day). By measuring the items, either manually or using an automated method (such as a CubiScan™ machine), accurate item dimension values may be determined.

Finally, as illustrated in FIG. 3, the method may include updating any stored item dimension values with values obtained by measuring the item(s), as in 360. In some embodiments, updated item dimension values may be incorporated in a real-time or near real-time manner, such as to enable recommendations of containers, portals, or paths for groups of items containing overlapping contents to use updated dimension values and/or updated confidence levels. In some embodiments, if updated item dimension values are determined for a given item, the method may include automatically initiating a manual review (or an updated container recommendation) for any item packages that are currently in the facility that include the given item, may indicate that preparation of any item packages that are to include the given item should be postponed, may reduce any allowable variance with respect to the given item so as to maximize the likelihood of identifying other packages that include copies of the given item that have a problem, or may take other action to prevent problems concerning the storage, transport or shipping of groups of items containing the given item. In other embodiments, the method may include measuring items for which currently stored item dimension values are suspect at another time rather than during normal operations (e.g., once per day or once per shift) and updating any corrected item dimension values after one or more of the measurements have been performed (e.g., by re-loading one or more tables, databases, or other data structures with corrected item dimension values after all items scheduled to be measured at the end of the shift have been measured.)

In some embodiments, an external party (e.g., a supplier or manufacturer of an item) may provide item dimension value information for items that they supply. In some embodiments, such third-party information may be used as an initial default value for the item dimension values, and may be adjusted by the product dimension correction system if the values are determined to be inaccurate (e.g., if it is determined that they contribute to detected incongruities between recommended and actual containers of item packages that include the items.) In some embodiments, if the item dimension values associated with a given item are trusted to be accurate (e.g., if the item has been measured recently and the associated item dimension values were corrected or did not require correction), the product dimension correction system may consider this situation when determining which, if any, of the items in an item package should be measured if a mismatch occurs between a recommended container and an actual container. For example, in one embodiment, all item dimension values obtained by measuring an item within a given time period (e.g., within the last week or month) may be considered trusted, and the item may be given a lower priority for additional measurements when a container incongruity is detected. Similarly, if the item dimension values provided by a particular vendor have consistently been shown to be accurate (e.g., by measuring some or all of the items and comparing the measurements to the item dimension values provided), any item dimension values provided by the particular vendor may be considered trusted, and the corresponding items may be given a lower priority for additional measurements when a container incongruity is detected. In another example, some item dimension values are standard for a particular product type (e.g., the width of CDs, DVDs, or VHS products) and may be considered trusted dimensions.

As described above, an agent or automated operation of the materials handling facility may in some embodiments provide feedback to facilitate product dimension correction. For example, an agent or automated operation may provide inputs to a software application executing on a computing system in the facility (or remotely) that is configured to perform product dimension correction. The product dimension correction application may be configured to perform the functionality illustrated in FIG. 3, or similar functions suitable for performing product dimension correction as described herein.

Figure 4:
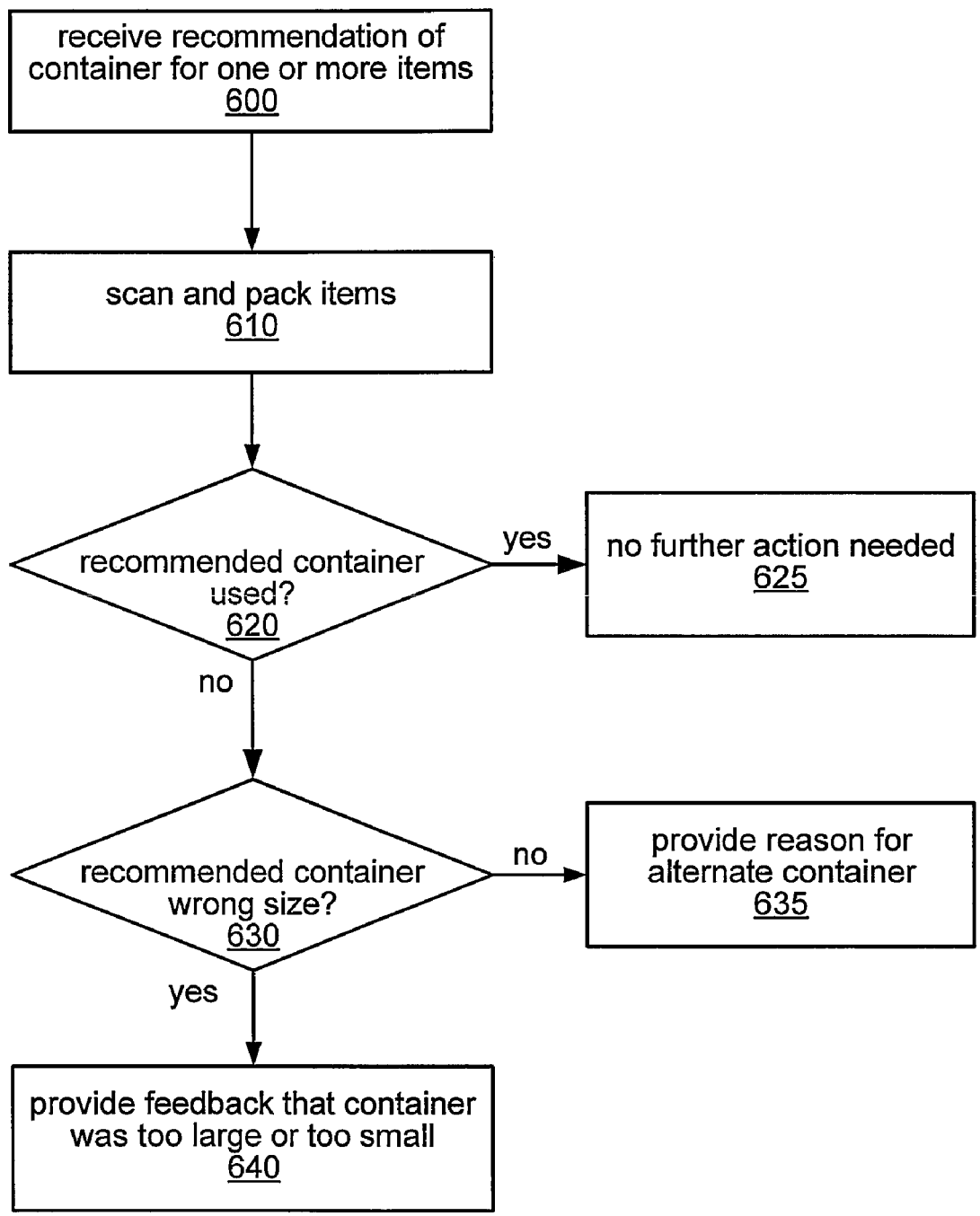
FIG. 4 illustrates a method for providing feedback to a product dimension correction system, according to one embodiment.

One method of providing feedback to a product dimension correction system (e.g., a product dimension correction application) is illustrated by the flowchart in FIG. 4. In this example, an agent or automated system may receive a recommendation of a container for one or more items to be handled in the facility, as in 600. For example, a packing list for an item package (whether electronic or paper) may include a recommendation of a box in which to ship the item package. A packing agent or automated packing mechanism may scan each of the items as they are packed in a box for shipping, as in 610. This information (e.g., an identifier of each of the items and an identifier of the box) may be provided to the product dimension correction system automatically as the items and box are scanned, or may be explicitly provided at a later time (e.g., it may be uploaded when the packaging is complete and/or may include other feedback from the agent or automated operation.)

If the item package is packed in the recommended container, shown as the positive exit from 620, no further action may be required on the part of the agent and/or automated system for this item package. Any information collected as part of the packing operation may be stored in one or more tables, databases, or other data structures for further analysis.

If, however, the item package is not packed in the recommended container, shown as the negative exit from 620, feedback may be provided to the product dimension correction system. In this example, if feedback from an agent or an automated operation indicates that the recommended container was not used because it was the wrong size for the item package (e.g., if it was too small, was larger than necessary to contain the items, or was the wrong shape to contain the items), shown as the positive exit from 630, this information may be included in feedback provided by the agent or automated system, as in 640. If, on the other hand, the recommended container was appropriately sized for the item package but was not used, shown as the negative exit from 630, the agent or automated system may provide feedback regarding the reason that the recommended container was not used, as in 635. For example, the feedback may indicate that the recommended container may not have been available, that the recommended container was not strong enough for shipping heavy or fragile items included in the item package, or that the recommended container may not have been made of a material suitable for shipping fragile or sharp-edged items (e.g., the recommended container may be flexible, rather than stiff, or may be easily punctured.)

As noted above, a product dimension correction system may use various methods for detecting inaccurate item dimension values and/or for correcting those values. One method for detecting and correcting inaccurate item dimension values is illustrated by the flow chart in FIG. 5. In this example, the product dimension correction system may have received an indication that the actual container used to handle an item package was different from a recommended container and may be configured to determine why they were different and/or if any corrections should be applied to stored item dimension values. The method illustrated in FIG. 5 includes calculating a volumetric utilization for the item package in the recommended container, shown as 400. For example, calculating a volumetric utilization for the recommended container may involve calculating the volume of the recommended container (e.g., based on stored container dimension values) and calculating the total volume of the items in the item package (e.g., based on the currently stored item dimension values). In this example, the total volume of the items may be calculated as the sum of the calculated volumes of each of the items, or may be calculated as the volume of a bounding box having dimensions just large enough to contain the items according to a currently used packing algorithm or procedure. The volumetric utilization may then be calculated as the ratio of the total volume of the items in the item package to the volume of the recommended container (e.g., the volume of the items divided by the container volume or as a percentage of the container volume). Similarly, the method may involve calculating a volumetric utilization for the item package in the actual container, shown as 410.

As illustrated at 420 of FIG. 5, the method may include comparing the volumetric utilizations of the recommended container and the actual container to see if they are equal. If they are equal, shown as the positive exit from 420, no changes may be needed in the item dimension values, as shown in 430. If, however, the volumetric utilizations are not equal, shown as one of the negative exits from 420, corrective action may be performed. For example, if the comparison indicates that the recommended container was larger than necessary (e.g., if the volumetric utilization of the recommended container was less than the volumetric utilization of the actual container), a counter (e.g., a "suspect dimensions counter") associated with each of one or more items in the item package may be incremented, as in 422. This value of each counter may indicate the number of times that the item dimensions of the associated item were considered suspect. For example, if a given item is included in three item packages for which the volumetric utilization of the recommended container was less than the volumetric utilization of the actual container, the suspect dimension counter value associated with the item may be three.

Similarly, if the comparison indicates that the recommended container was too small (e.g., if the volumetric utilization of the recommended container was greater than the volumetric utilization of the actual container), a suspect dimension counter associated with each of one or more items in the item package may be incremented, as in 421. In some embodiments a single suspect dimension counter value may be incremented when an item is included in an item package for which the recommended container is too large or too small, while in other embodiments, two suspect dimension counter values may be associated with each item (e.g., one indicating the number of times the item was included in an item package for which the recommended container was too large and another indicating the number of times the item was included in an item package for which the recommended container was too small.)

In the example illustrated in FIG. 5, if the suspect dimension counter value indicating the number of times that a given item was included in an item package for which the recommended container was too large exceeds a pre-determined threshold, further action may be taken. This is illustrated as the positive exit of 424. For example, in some embodiments, further action may be taken each time an item package is packed in a container smaller than a recommended container (e.g., the threshold may be set to a value of one). In other embodiments, further action may not be taken until or unless a given item is included in two or more item packages that are packed in a container smaller than a recommended container (e.g., the threshold may be set to a value of two or higher.) In some embodiments, setting the threshold to a value of two or higher may result in excluding individual human errors, such as a wrong box bar code being scanned or items being squeezed into a smaller box than is optimal for the item(s), and may result in identifying only those item packages that are likely to include items for which inaccurate dimensions are currently stored. At 426, in this example, any items for which the associated suspect dimension counters have exceeded the threshold may be flagged for a measurement. If the suspect dimension counter value does not exceed the pre-determined threshold, no further action may be taken. This is shown as the negative exit from 424.

Similarly, if the suspect dimension counter value indicating the number of times that a given item was included in an item package for which the recommended container was too small exceeds a pre-determined threshold, further action may be taken. This is illustrated as the positive exit of 423. As in the previous example, such a threshold may be set to a value of one, or may be set to a value of two or higher to exclude one-time errors other than inaccurate item dimensions. If the threshold is exceeded for one or more items, the items may be flagged for a measurement, as in 425. If the threshold is not exceeded, shown as the negative exit from 423, no further action may be taken. As noted above, in some embodiments, a single suspect dimension counter value may be used to count the number of times that a given item is included in an item package that is packed in a different container than a recommended container, regardless of whether the container is too large or too small for the item package. In such embodiments, a single threshold may be set for the number of time the item's dimensions are considered suspect before the item is flagged for measurement.

Items for which the suspect dimension counter exceeds a threshold, and whose dimensions are considered suspect, may in some embodiments, be flagged for immediate measurement by the product dimension correction system (e.g., a measurement may be initiated and performed before any more of the items are allowed to be packaged and/or shipped.) In other embodiments, the product dimension correction system may be configured to periodically determine the items flagged as having suspect item dimensions and to sort them according to those most likely to have inaccurate item dimensions. For example, in one embodiment, the twenty items having the highest suspect dimension counter values each day may be flagged for a measurement overnight. In another example, all items for which the suspect dimension counter value exceeded a pre-determined threshold during the day may be added to a running list of items to be measured and may be removed from the list (and their suspect dimension counters reset or cleared) after they are measured.

In the example illustrated in FIG. 5, once any items flagged for measurement have been measured, the stored dimensions associated with the items may be updated according to the measured values, as in 440. Updating an item's dimensions may include replacing a currently stored value with a newly measured value, updating a range of allowable values for an item having variable dimensions, and/or updating a confidence level for an item's dimensions, in various embodiments. For example, in one embodiment, a confidence level associated with each item may be dependent on how recently an item has been measured (e.g., using a CubiScan™ machine) or on a number or percentage of item packages that include the item that were packaged in a recommended container. In some embodiments, an item's dimensions may be considered to be trusted dimensions if a confidence level associated with the item exceeds a given threshold, or if the item has been measured within a given time period, as previously described.

In some embodiments, when an item is flagged for a measurement and is measured, if the newly measured values of its dimensions differ from previously stored item dimensions, the previously stored item dimensions may be replaced by the new measurements, and (optionally) a confidence level associated with the item may be raised. Alternately, if the newly measured values match the previously stored values, the item dimension may not be updated, but a confidence level may be raised. Thus, in some embodiments, each time an item is measured, a confidence level associated with the item's dimensions may be raised (or validated.) In other embodiments, a confidence level may be raised (or validated) each time the item is included in an item package that is packed in a recommended container and may be lowered (or invalidated) each time it is included in an item package that is packed in a container different than a recommended container.

The algorithms used by the product dimension correction system are not intended to be limited to those described above and may include any other algorithms suitable for determining if item dimensions associated with any items in an item package are inaccurate dependent on an actual container used to handle the item package, according to different embodiments. For example, the product dimension correction system may use different packing algorithms to determine a recommended container for an item package, or may use a combination of measured and observed data (e.g., observations input to the system by a packing agent) to determine if a recommended container is the most suitable container for a given item package. In another example, the product dimension correction system may in some embodiments flag all packaging incongruities for manual inspection (e.g., for measurement of one or more items included in the item package) at the time the incongruities are detected, rather than flagging individual items for measurement based on detection of two or more incongruities in a given time period.

A product dimension correction system may use a different method than that described above for determining which, if any, items included in an item package handled in a container other than a recommended container should be measured, in different embodiments. For example, instead of maintaining a count of the number of times an individual item has been included in an item package when a packaging incongruity is detected, the system may be configured to maintain a list of item packages for which packaging incongruities have been detected. This list may be analyzed to determine if the item packages include any common items (e.g., by comparing the identifiers of the items included in each item package.) In some embodiments, if an item identifier appears on more than a pre-determined number of item package lists for which packaging incongruities have been detected, that item may be flagged for a measurement (e.g., by adding it to a list of items having suspect dimensions.) Similarly, if items included on an item package list associated with a single packaging incongruity are not included on the item package lists associated with any other packaging incongruities, those items may be eliminated from a list of items with suspect dimensions. By repeatedly comparing the items included in item packages for which packaging incongruities are detected, the product dimension correction system may in some embodiments be configured to narrow down the list of items for which stored item dimensions are suspect and to reduce the number of items flagged for measurement. For example, in one embodiment, the product dimension correction system may be configured to examine a list of item packages associated with packaging incongruities and a list of item packages that were packaged in recommended containers once per day and to generate a list of items having suspect dimensions by identifying those items that are common among item package lists and eliminating those that are common among item packages packaged in a recommended container.

The product dimension correction system may be further described using the following example. In this example, an e-commerce organization sells items of various types that can be shipped to customers. For the sake of simplicity, five example items are shown in an item parameter data store, in Table 1, below. In this example, each item has a corresponding unique identifier, name, and type in columns 1-3. The item parameter data store also includes columns for storing values for various parameters of each item (columns 4-6), which in this example includes the item height, length, and width. The values in column 7, in this example, indicate a count of the number of times the item dimensions have been considered suspect for each item (e.g., the number of times that the item was included in an item package that was packaged in a container other than a recommended container.)

TABLE 1

| item ID | item name | item type | item height (in) | item length (in) | item width (in) | suspect dimension count |
|---|---|---|---|---|---|---|
| 4982 | book1 | book | 8.40 | 6.40 | 2.59 | 0 |
| 4325 | book2 | book | 8.29 | 6.40 | 2.59 | 15 |
| 2309 | book3 | book | 8.59 | 6.40 | 2.59 | 1 |
| 0873 | shoe17 | shoe | 14.00 | 8.00 | 6.54 | 5 |
| 1832 | DVD1 | DVD | 7.48 | 5.31 | 0.55 | 0 |

While not shown, in other embodiments additional information may be stored in an item parameters data store, such as a confidence level for the item dimension values, information on statistical variances in the dimension values, or other indications of allowable deviations from the dimension values. In some embodiments, determining a confidence level for one or more of the dimensions of an item may involve repeated measurements (such as measurements performed in response to detected packaging incongruities), followed by calculation of a mean or standard deviation, or detection of a trend, rate of change, or other pattern in the measurements. In some embodiments, a product dimension correction system may count the number of times (or percentage of times) that an item is packaged in a recommended container to determine a confidence level for the item's dimensions.

In one example, a manufacturer or supplier may provide item dimensions for the items shown in Table 1. These may be used as the initial or default item dimension values that are used to recommend a container in which each item may be packaged, either alone or along with other items in an item package, until or unless any measurements of the item are initiated in response to a packaging incongruity.

As previously described, the product dimension correction system may, in some embodiments, capture container, portal, or path information, such as container, portal, or path dimensions, container contents, or identifiers of items passing through a portal or on a path. In some embodiments, dimensions and/or other parameter values for the containers, portals or paths may be stored in one or more tables, databases, or other data structures, such as the container parameters data store illustrated in Table 2 below. In this example, a container identifier, a container name, and a container type are stored in each entry of Table 2 in columns 1-3. Dimension values for various containers, portals, and paths are shown in columns 4-9. In some embodiments, a manufacturer or supplier of a container may provide the values of various container parameters, including container dimensions. In other embodiments, container, portal, or path parameters may be determined by measuring one or more instances of each container, portal, or path type.

As used in describing the example embodiments herein, references to a "container" may include any dimensionally-constrained environment, including conventional containers (e.g., boxes, bins, and the like), portals (doorways, hatches, etc.) and dimensionally-constrained paths (chutes, tracks, conveyor belts, etc.), as described herein. In this example, the available "containers" include three types of boxes in which items may be shipped (as shown in rows 1-3 of the data store), three types of containers or paths in which items may be conveyed in the materials handling facility (as shown in rows 4-6 of the data store), two types of containers in which items may be stored in the materials handling facility (as shown in rows 7-8 of the data store), and one portal through which items may pass in the facility (as shown in row 9 of the data store).

TABLE 2

| container ID | container name | container type | height (inches) | length (inches) | width (inches) |
|---|---|---|---|---|---|
| 413 | smallbox1 | box | 19.0 | 13.0 | 11.75 |
| 293 | smallbox2 | box | 22.0 | 18.0 | 11.75 |
| 338 | bigbox1 | box | 24.00 | 16.00 | 16.00 |
| 103 | tote1 | tote | 24.00 | 24.00 | 12.00 |
| 391 | cart2 | cart | 48.00 | 36.00 | 24.00 |
| 789 | belt1 | belt | — | 47.50 | 24.00 |
| 651 | bin7 | bin | 27.00 | 18.00 | 15.00 |
| 265 | shelf3 | shelf | 33.00 | 27.00 | 18.00 |
| 739 | gate7 | portal | — | 60.00 | 48.00 |

In the example illustrated by Table 2, the values for the height, length, and width are shown for each container except for the conveyor belt, labeled belt1, and the portal, labeled gate7. In some embodiments, a manufacturer or supplier may provide the volume along with the dimensions, while in other embodiments, the product dimension correction system may calculate the volume from supplied or measured dimensions. In this example, the length of belt1 may not be specified because the conveyor belt length may not be a restricting dimension. That is, as long as an item may be placed on the belt (without overlapping its width) and is not too tall to pass through any spaces in the materials handling facility through which the conveyor belt passes, the item may be said to "fit" on the conveyor belt. Similarly, the length of gate7 may not be specified because it may not add any constraints on the items that pass through gate7.

In some embodiments, the product dimension correction system may store recommended and actual container dimensions for item packages in a table, database, or other data structure, such as Table 3 below, and may use this information to determine if dimensions of one or more items of an item package are suspect or inaccurate. In this example, Table 3 illustrates a package parameters data store, in which each entry (row) includes information about actual versus recommended containers for item packages handled in the materials handling facility. Note that in some embodiments the grouping of items within containers may be temporary and may change with various operations of the facility. For example, items for several orders may be placed together in a tote during a "pick" operation and then sorted into different groups, by order, and placed into boxes for shipping. Therefore, the information stored in a package parameters data store, such as the one illustrated by Table 3, may, in some embodiments, represent snapshots in time for particular containers and those containers may contain other items at other times. Each of these snapshots may include a unique group or package identifier, as shown in column 1, in some embodiments. In other embodiments, a package identifier may correspond to a particular customer order or container, rather than a snapshot of an item grouping.

In this example, each entry includes a list of the container contents (e.g., the contents of an item package) along with the number of copies of each item included in the item package, and the identifier, length, height, and width of both the recommended container and the actual container. For example, in Table 3, column 3 is used to store the name of the container recommended to handle each item package, and columns 4-6 are used to store the height, length, and width of the recommended container, respectively. Similarly, column 7 is used to store the name of the actual container used to handle each item package, and columns 8-10 are used to store the height, length, and width of the actual container, respectively. In another embodiment, the recommended and/or actual container dimensions may not be included in the package parameters data store if it is already stored in another data store, such as the one illustrated by Table 2. In some embodiments, additional information may be stored in a package parameters data store, such as a date or timestamp for each entry or a batch number or other identifier of specific item or item group instances (not shown). In other embodiments, more, fewer, or different parameters may be stored in a package parameters data store, or similar information may be stored in other combinations in one or more other tables, databases, or other data structures.

TABLE 3

| package ID | package contents | Recom cont. | R ht. | R lg. | R wd. | Actual cont. | A ht. | A lg. | A wd. |
|---|---|---|---|---|---|---|---|---|---|
| 872093 | book1x2, book2x6, book3x6 | small-box2 | 22 | 18 | 11.75 | small-box1 | 19 | 13 | 11.75 |
| 832189 | book1x3, book2x4, book3x7 | small-box2 | 22 | 18 | 11.75 | small-box2 | 22 | 18 | 11.75 |
| 098731 | book2x12, DVD1x2 | small-box1 | 19 | 13 | 11.75 | small-box1 | 19 | 13 | 11.75 |
| 631248 | book1x4 | bigbox1 | 24 | 16 | 16 | bigbox1 | 24 | 16 | 16 |

TABLE 3-continued

| package ID | package contents | Recom cont. | R ht. | R lg. | R wd. | Actual cont. | A ht. | A lg. | A wd. |
|---|---|---|---|---|---|---|---|---|---|
| | book2x8 shoe17x3 | | | | | | | | |

In some embodiments, the information captured and stored in data stores such as those illustrated by Tables 1, 2, and 3 may be collectively used by the product dimension correction system to identify inaccurate dimensions currently associated with items in the materials handling facility. For example, the parameter values illustrated in Tables 1, 2, and 3 may be used to determine that the item dimensions for items book1, book2, and book3 items are suspect, using the methods illustrated in FIGS. 3, 4, and/or 5. In this example, the recommended container and the actual container in which item package 872093 was handled were different, with the actual container being smaller than the recommended container. This may indicate that the currently stored item dimensions of one or more of the items in the item package may be inaccurate (in this case, they may be suspected to be larger than the actual dimensions of the items). In this example, since the suspect dimension count for book2 exceeds a pre-determined threshold of 5, the product dimension correction system may be configured to initiate a measurement of item book2. Measurement of items book1 and book3 may in some embodiments be given a lower priority, since the suspect dimension counts for these items are much lower. If the measured item dimensions for item book2 are different than those listed in Table 1, the item dimension values stored in Table 1 may be corrected and used for future container recommendations. In this case, an associated confidence level may also be updated for the item, in some embodiments.

As previously described, the product dimension correction system may analyze information stored in the various data stores, as described above, to validate previously measured or supplied values for item dimensions, in some embodiments. For example, if item book1 is also measured and is found to have item dimensions matching those in Table 1, a confidence level associated with the stored dimension values of item book1 may be raised.

While many of the examples described above involve item packages that include two or more items, the methods may be applied by the system to recommend a container suitable for handling a single item in the materials handling facility and to determine if item dimensions are inaccurate based on the actual container used to handle the item, in other embodiments.

In some embodiments, such as those described herein, it may be assumed that all items in a group must fit entirely into each of the containers in the materials handling facility into which they are placed. In other embodiments, this restriction may not be required. For example, in some embodiments, it may be permissible for items to stick out of the top or side of a tote, belt, etc., when being stored or transported within the materials handling facility. In these embodiments, there may need to be additional information input to the system to allow inaccurate item dimensions to be determined and/or corrected, such as by detecting differences between recommended and actual containers only when these items are placed into containers in which they must be completely contained, such as for shipping.

As previously noted, maintaining correct item dimension values for items in a materials handling facility may in some embodiments facilitate item identification for a picking operation. For example, if a copy of item book3 is on a pick list, an agent may be directed to an inventory area containing a copy of this item along with one or more copies of item book2. In this example, the agent may be directed to select the "tallest" book from this area, as the height of item book3 is 8.59 inches and the height of item book2 is 8.29 inches, as shown in Table 1.

Exemplary System Embodiments

Automated product dimension correction, as described herein, may be implemented in one or more software modules executing on one or more nodes of a computing system or using any combination of hardware and software components of a computing system, in various embodiments. Item and container dimension values may be stored in one or more tables, databases, or other data structures maintained on one or more computing system nodes within a materials handling facility and/or remote computing system nodes configured to communicate with the operations of the materials handling facility. Similarly, container recommendations and/or feedback regarding actual containers in which item packages are handled may be exchanged between one or more computing system nodes within a materials handling facility and/or remote computing system nodes configured to communicate with the operations of the materials handling facility.

Figure 6:
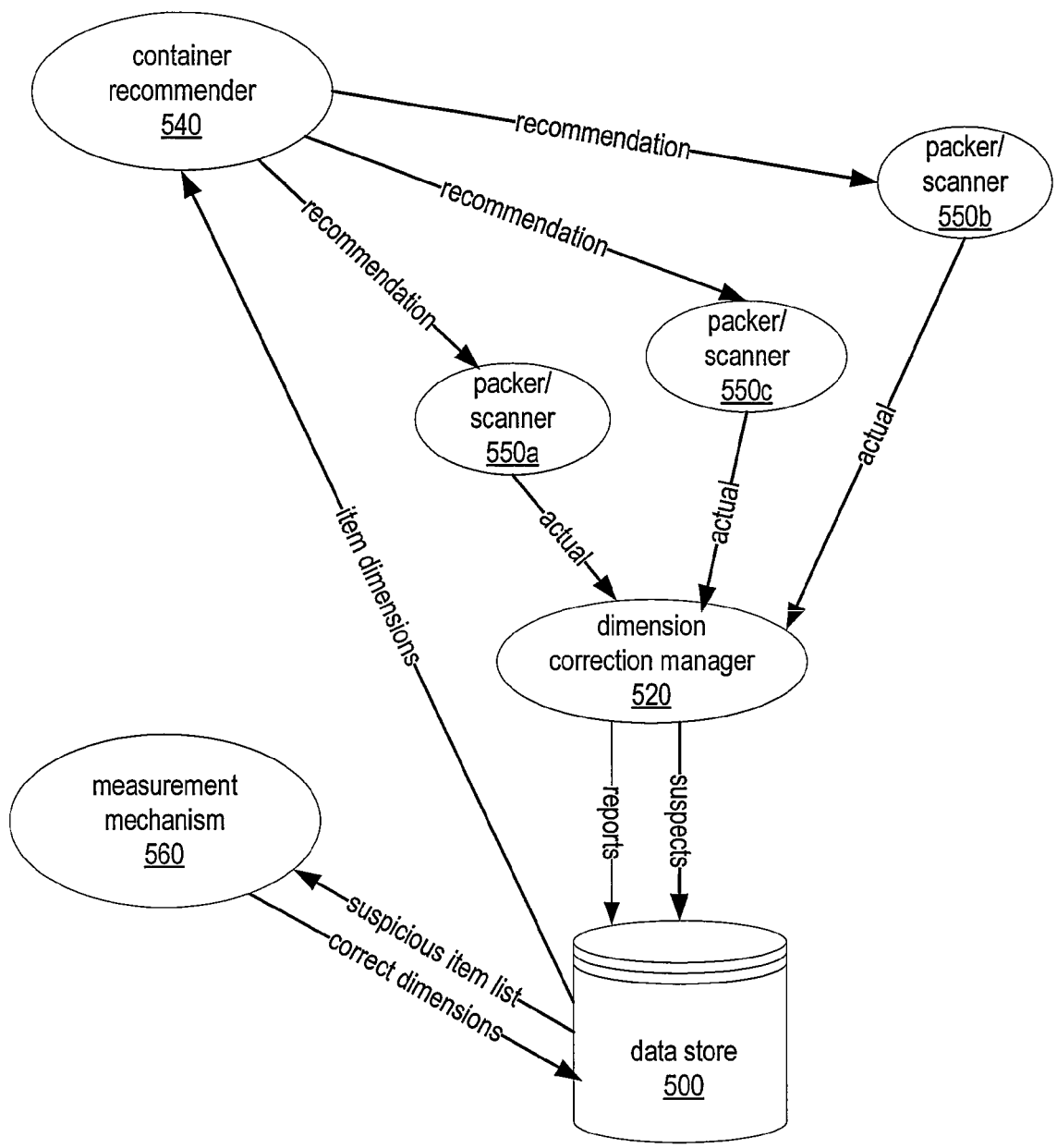
FIG. 6 illustrates a data flow diagram for a system implementing product dimension correction, according to one embodiment.

A data flow diagram for a product dimension correction system, as described herein, is illustrated in FIG. 6 according to one embodiment. The product dimension correction system may include various hardware and/or software components configured to carry out the operations described herein as part of product dimension correction. In this example, data store 500 may be a data store containing item parameter values for all of the items handled within a materials handling facility. A container recommender 540 may access data store 500 to obtain currently stored item dimension values for items in an item package and may use this information to recommend a container in which the item package may be handled, as described above.

As illustrated in FIG. 6, container recommender 540 may provide recommendations of containers suitable for handling item packages to various packer/scanner operations 550. For example, each of the recommendations provided to packer/scanner operations 550a, 550b, and 550c may include a packing list and a recommended container for the items on the packing list. The packer/scanner operations 550 may then provide information regarding actual containers used to handle the item packages to dimension correction manager 520. In this example, dimension correction manager 520 may be configured to determine if the actual container and recommended containers were the same and/or to report any differences between actual and recommended containers for item packages. This is illustrated as reports provided by dimension correction manager 520 to data store 500. In addition, dimension correction manager 520 may be configured to provide a list of items included in item packages for which actual containers are not the same as recommended containers. This is illustrated as suspects provided by dimension correction manager 520 to data store 500.

In the example illustrated in FIG. 6, data store 500 may be a data store located within the materials handling facility itself and accessed by the various operations of the facility. In this example, data store 500 may be configured to determine which, if any, item dimension values may be inaccurate and to provide a list of items to be measured. For example, data store 500 may be configured to increment a suspect dimensions count for each item provided as a suspect by dimension correction manager 520 and to determine if a suspect dimension threshold has been exceeded for those items. Each item for which a suspect dimension threshold has been exceeded may be flagged for measurement. This is illustrated as the suspicious item list provided by data store 500 to measurement mechanism 560.

Measurement mechanism 560 may receive a suspicious item list from data store 500 and may initiate measurement of the items on the list. For example, measurement mechanism 560 may be configured to present a list of items to measure to an agent on a computer terminal display or may transmit such a list to a handheld display device or to an automated picking and/or measuring system. An agent or automated system may then measure the items on the list and provide measured item dimension information to data store 500. This is illustrated as correct dimensions provided by measurement mechanism 560 to data store 500. These correct dimensions may replace inaccurate or outdated item dimension values previously stored by data store 500 and/or may validate or raise a confidence level for item dimension values previously stored by data store 500. These correct dimension values may then be provided to container recommender 540 the next time the measured items are included in an item package for which a container recommendation is being made.

While the embodiment illustrated by FIG. 6 includes a dimension correction manager 520, a container recommender 540, and a measurement mechanism 560 that are separate components of a system configured to perform dimension correction, in other embodiments, the functionality described as being performed by each of these components may all be performed by sub-components of a single system component, or may be partitioned in other ways. For example, in one embodiment, container recommender 540 may be implemented as a module of a software application configured to implement dimension correction manager 520. In another example, data store 500 may be located in a memory of the same computing node or of a different computing node than a memory that includes program instructions configured to implement dimension correction manager 520 and/or container recommended 540.

In some embodiments, the product dimension correction system may also include a remote data store, such as a data store located at a headquarters of a company operating the materials handling facility. In some embodiments, metrics may be provided by data store 500 to such a remote data store concerning the operations of the materials handling facility. For example, metrics may be provided indicating the number or percentage of item packages that were handled in a recommended container in a given time period, the number or percentage of item packages that were handled in a container larger or smaller than a recommended container in a given time period and/or why, the number or percentage of item dimensions that were corrected in a given time period and/or for items from a particular manufacturer or supplier, or the number of items measured and/or found to be associated with inaccurate item dimensions in a given time period. These and/or other metrics that may be extracted from data store 500 may be analyzed and compared to similar metrics received by a remote data store from other materials handling facilities, in some embodiments. For example, these metrics may be used to identify best practices at one or more materials handling facilities. In another embodiment, corrected item dimensions may be provided to a remote data store by data store 500 and these may be distributed to other materials handling facilities configured to exchange information with the remote data store.

Figure 7:
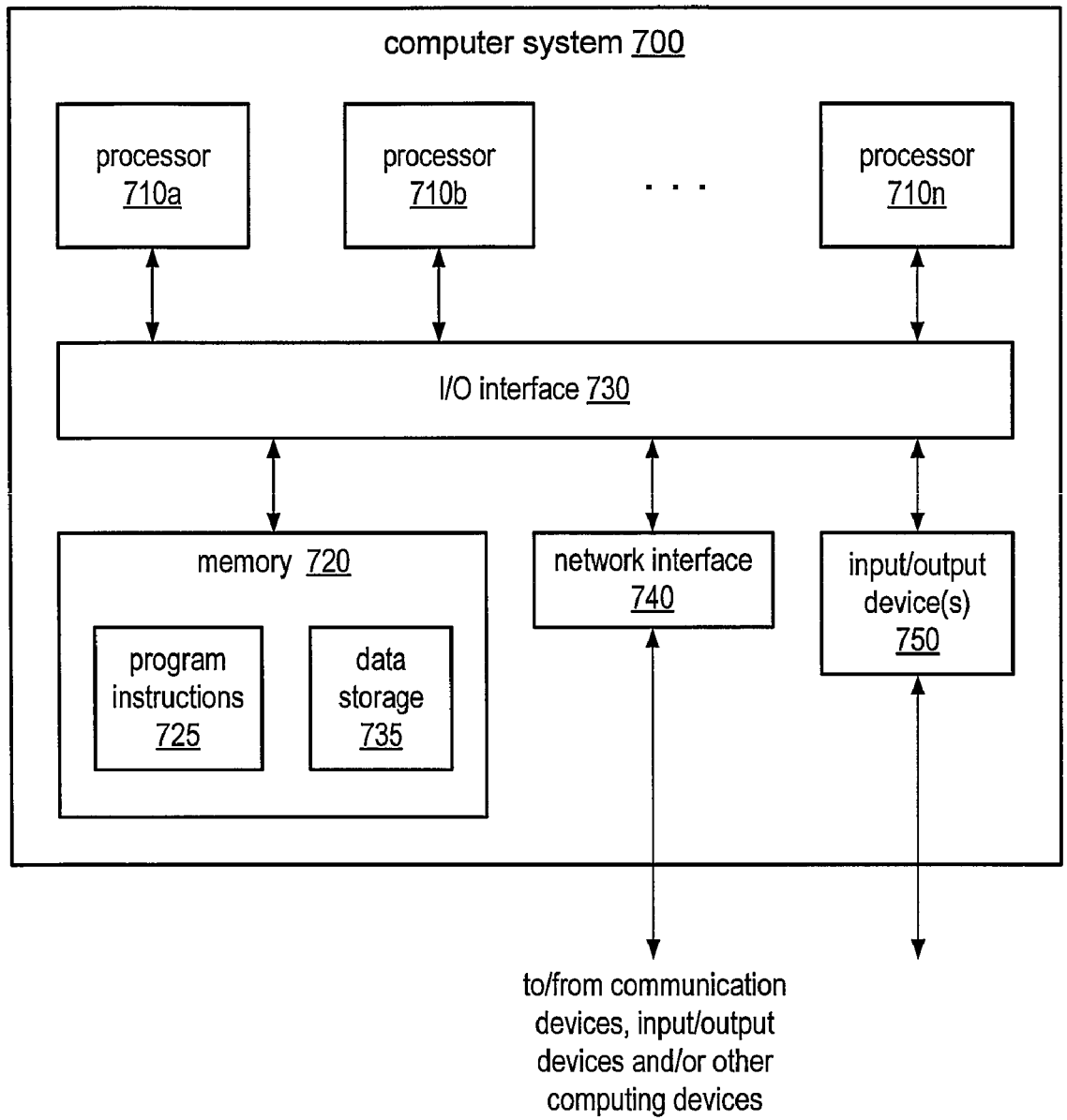
FIG. 7 is a block diagram illustrating an exemplary embodiment of a computer system suitable for implementing product dimension correction.

Automated product dimension correction, as described herein, may be executed on one or more computer systems, interacting with various other devices in a materials handling facility, according to various embodiments. One such computer system is illustrated by FIG. 7. In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750. In some embodiments, it is contemplated that automated product dimension correction may be implemented using a single instance of computer system 700, while in other embodiments multiple such systems, or multiple nodes making up computer system 700, may be configured to host different portions or instances of automated product dimension correction. For example, in one embodiment some data sources or services (e.g., capturing actual container information) may be implemented via one or more nodes of computer system 700 that are distinct from those nodes implementing other data sources or services (e.g., recommending a container for an item package). In some embodiments, a given node may implement the functionality of more than one component of automated product dimension correction.

In various embodiments computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

System memory 720 may be configured to store program instructions and/or data accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above, are shown stored within system memory 720 as program instructions 725 and data storage 735, respectively. In other embodiments, program instructions and/or data may be received, sent or stored upon different types of computer-accessible media or on similar media separate from system memory 720 or computer system 700. Generally speaking, a computer-accessible medium may include storage media or memory media such as magnetic or optical media, e.g., disk or CD/DVD-ROM coupled to computer system 700 via I/O interface 730. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 740.

In one embodiment, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computer system 700 and other devices attached to a network, such as other computer systems, or between nodes of computer system 700. For example, in one embodiment a measurement mechanism, such as measurement mechanism 560 described above, may be configured to communicate with computer system 700 via network interface 740. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or retrieving data by one or more computer systems 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

As shown in FIG. 7, memory 720 may include program instructions 725, configured to implement automated product dimension correction, and data storage 735, comprising various tables, databases and/or other data structures accessible by program instructions 725. In one embodiment, program instructions 725 may include various software modules configured to implement a product dimension correction system, as described in FIGS. 3-6. Data storage 735 may include various data stores for maintaining item parameter values (such as those illustrated as being stored in Table 1), container parameter values (such as those illustrated as being stored in Table 2), item package information (such as that illustrated as being stored in Table 3), shipping reports (not shown), etc.

One module included in program instruction 725 for a product dimension correction system may be an information gathering module configured to capture the contents of item packages handled within an actual container. As described earlier, capturing the contents of a container may include capturing identifiers of both the container and its contents, and may be performed when items are placed in the container or at any other time. In some embodiments, these identifiers may be captured automatically by sensors or scanners. In other embodiments, an agent working in the facility may cause them to be captured by using a scanner or other means, in various embodiments. An information gathering module may, in some embodiments, include program instructions configured to control such automated capturing and/or may include program instructions configured to receive this information as inputs and store it in memory 720 (e.g., in data storage 735). An information gathering module may also include instructions configured to retrieve the dimensions of actual containers, portals, and paths used to handle an item package, such as by accessing their values in memory according to a captured identifier, in some embodiments. Information gathered by an information gathering module may in some embodiments be received via one or more of input/output devices 750, or from devices configured to communicate with computer system 700 via network interface 740, in different embodiments.

Another software module included in a product dimension correction system and included in program instructions 725 may be a container recommender module, such as container recommender 540 described above. In some embodiments, this module may include program instructions configured to implement recommending a container for an item package, such as described above regarding operation 300 of FIG. 3. In some embodiments, a container recommender may include program instructions configured to identify items to be grouped for one of the operations of the materials handling facility by receiving or generating a stow list, pick list, inventory list, order, packing list, etc., which may be a physical list, such as a printed list, or may be a virtual list, such as may be contained in memory, displayed on a monitor or other input/output device, or scanned automatically or by an agent in the materials handling facility to serve as an input to the automated product dimension correction system. A container recommender may also include program instructions configured to retrieve currently stored item dimensions of any of the items in the item package, in some embodiments. As described above, these dimensions may be retrieved from a table, database, or other data structure, such as Table 1 illustrated above. Finally, a container recommender may be configured to determine a recommended container, portal, or path for handling the group of items, as described in detail above.

Another software module making up a product dimension correction system and included in program instructions 725 may be a feedback handler. In some embodiments, this module may include program instructions configured to implement receiving feedback from various operations of a materials handling facility to be used by the product dimension correction system. This feedback may include an indication of whether or not a recommended container, portal, or path was used, a reason that a recommended container, portal, or path was not used, an indication that one or more items was not completely located within a container, information gathered during an item measurement, or any other feedback received from the various operations of the facility. This feedback may be received via one or more of input/output devices 750, or from devices configured to communicate with computer system 700 via network interface 740, in different embodiments.

In some embodiments, the feedback handler may receive feedback related to packages and item contents of packages from other sources, such as based on item/package returns and/or customer support interactions (e.g., an indication of package suitability or item damage). In some embodiments, the feedback handler may include program instructions configured to control one or more input/output devices used to provide automated feedback, such as sensors or scanners, or may include program instructions configured to receive feedback entered manually by an agent in the facility, such as by entering it at a terminal or by pressing one or more buttons, levers, switches, etc.

An automated product dimension correction system may also include a dimension correction manager, such as dimension correction manager 520 illustrated in FIG. 6, as part of program instructions 725. The dimension correction manager may include program instructions configured to implement determining which items have inaccurate item dimension values, as described above. It may also be configured to update one or more tables, databases, or other data stores of parameters associated with items and containers in a materials handling facility in response to receiving measured item dimension values and/or other inputs. For example, the dimension correction manager may be configured to update one or more item dimension values, ranges, or confidence levels in response to determining a packaging incongruity and/or measuring an item included in an item package for which a packaging incongruity was detected.

As noted above, data storage 735 may include one or more tables, databases, or other data structures used for storing and retrieving various parameter values used in conjunction with the system and methods described herein. For example, a system for automated product dimension correction may include an item parameters data store, such as that illustrated in Table 1. An item parameters data store may include any data related to the items in the materials handling facility, such as an identifier, a weight, a volume, a length, a height, a width, a suspect dimensions count, or a confidence level value. It may also include item names, quantities, descriptions, pricing, cost, or any other information that may be included in a product catalog, inventory management system, or other representation of the items in the materials handling facility, in various embodiments.

Similarly, data storage 735 may include a container parameters data store, such as that illustrated in Table 2, which may include container identifiers, names, and dimensions. In various embodiments, a container parameters data store may also include such information as weight, color, composition, quantity, supplier name, or any other information about containers that may be useful to the various operations of the materials handling facility. In various embodiments, a container parameters data store may include any data related to the containers, portals, or paths used for storing, conveying, or shipping the items of the materials handling facility, as described herein. A product dimension correction system may, in some embodiments, retrieve this or any other information from the item parameters data store and/or container parameters data store necessary to perform the various functions described herein.

In some embodiments, data storage 735 may include a package parameters data store, such as that illustrated in Table 3. A package parameters data store may, in some embodiments, include information about actual containers and their contents (e.g., item packages handled within the actual containers), as well as recommended containers. For example, each entry in a package parameters data store may include the item package contents, as well as the recommended and actual container identifiers and their dimensions. In various embodiments, any or all of the tables described herein may be included in a single data store, such as data store 500 illustrated in FIG. 6.

In various embodiments, the parameter values and other data illustrated herein as being included in one or more data stores may be combined with other information not described or may be partitioned differently into more, fewer, or different data structures. In some embodiments, data stores used in automated product dimension correction, or portions thereof, may be physically located in one memory or may be distributed among two or more memories. These memories may be part of a single computer system or they may be distributed among two or more computer systems, such as two computer systems connected by a wired or wireless local area network, or through the Internet, in different embodiments. Similarly, in other embodiments, different software modules and data stores may make up an automated product dimension correction system.

Users may interact with the product dimension correction system in various ways in different embodiments, such as to automatically measure and/or manually specify measured dimension values for items and/or packaging, as well as to specify thresholds to be used when determining suspect item dimensions. For example, some users may have physical access to computing system 700, and if so may interact with various input/output devices 750 to provide and/or receive information. Alternatively, other users may use client computing systems to access the product dimension correction system, such as remotely via network interface 740 (e.g., via the Internet and/or the World Wide Web). In addition, some or all of the product dimension correction system components may provide various feedback or other general types of information to users (e.g., in response to user requests) via one or more input/output devices 750.

Those skilled in the art will appreciate that computing system 700 is merely illustrative and is not intended to limit the scope of the present invention. In particular, the computing system and devices may include any combination of hardware or software that can perform the indicated functions, including computers, network devices, internet appliances, PDAs, wireless phones, pagers, etc. Computing system 700 may also be connected to other devices that are not illustrated, or instead may operate as a stand-alone system. In addition, the functionality provided by the illustrated components may in some embodiments be combined in fewer components or distributed in additional components. Similarly, in some embodiments the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computing system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Those skilled in the art will appreciate that in some embodiments the functionality provided by the methods discussed above may be provided in alternative ways, such as being split among more software modules or routines or consolidated into fewer modules or routines. Similarly, in some embodiments illustrated methods may provide more or less functionality than is described, such as when other illustrated methods instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered. The various methods as illustrated in the figures and described herein represent exemplary embodiments of methods. The methods may be implemented in software, in hardware, or in a combination thereof in other embodiments. Similarly, the order of any method may be changed, and various elements may be added, reordered, combined, omitted, modified, etc., in other embodiments.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer accessible storage medium, other aspects may likewise be so embodied.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A computing system, comprising one or more computing nodes configured to implement:
   a memory that during operation stores item dimension values of one or more items in a materials handling facility; and
   a product dimension correction manager that during operation performs:
      receiving an indication of a recommended container that was recommended to collectively handle one or more items, wherein the indication of the recommended container comprises an identifier for the recommended container, and wherein the recommended container was selected dependent on the stored item dimension values of the one or more items that were to be collectively handled in the recommended container;
      receiving a feedback indication of an actual container in which the one or more items were actually handled, wherein the feedback indication of the actual container comprises an identifier for the actual container;
      comparing the identifier for the actual container to the identifier for the recommended container for a match to determine whether or not the recommended container was used to collectively handle the one or more items;

in response to the identifier for the actual container not matching the identifier for the recommended container based on said comparing, determining whether the one or more items were not handled in the recommended container because the recommended container was not appropriately sized; and initiating correction of at least one item dimension value stored in the memory in response to determining that the one or more items were not handled in the recommended container because the recommended container was not appropriately sized.

2. The system of claim 1, wherein during operation the memory further stores container dimension values of a plurality of containers used in the materials handling facility, and wherein said comparing the actual container to the recommended container comprises the product dimension correction manager:

calculating a volumetric utilization of the one or more items in the actual container;

calculating a volumetric utilization of the one or more items in the recommended container; and comparing the values of the volumetric utilizations.

3. The system of claim 1, wherein during operation the memory further stores container dimension values of a plurality of containers used in the materials handling facility, and wherein said determining that the one or more items were not handled in the recommended container because the recommended container was not appropriately sized comprises the product dimension correction manager determining if the recommended container is larger than the actual container dependent on the stored container dimension values.

4. The system of claim 1, wherein during operation the memory further stores container dimension values of a plurality of containers used in the materials handling facility, and wherein said determining that the one or more items were not handled in the recommended container because the recommended container was not appropriately sized comprises the product dimension correction manager determining if the recommended container is smaller than the actual container dependent on the stored container dimension values.

5. The system of claim 1, wherein said determining that the one or more items were not handled in the recommended container because the recommended container was not appropriately sized comprises the product dimension correction manager determining if the recommended container was not available for handling the one or more items.

6. The system of claim 1, wherein said determining that the one or more items were not handled in the recommended container because the recommended container was not appropriately sized comprises the product dimension correction manager receiving feedback indicating that the recommended container was too small to handle the one or more items, the recommended container was larger than necessary to handle the one or more items, or the recommended container was not available for handling the one or more items.

7. The system of claim 1, wherein said initiating correction of the at least one item dimension value comprises the product dimension correction manager initiating a measurement of at least one of the one or more items.

8. The system of claim 1, wherein said initiating correction of the at least one item dimension value stored in the memory comprises the product dimension correction manager:

determining if only one item is handled in the actual container; and in response to determining that only one item is handled in the actual container, incrementing a count representing a number of times that the item dimension values of the one item stored in the memory have been considered suspect.

9. The system of claim 8, wherein if the count exceeds a predetermined threshold, the product dimension correction manager initiates a measurement of the one item.

10. The system of claim 1, wherein said initiating correction of the at least one item dimension value stored in the memory comprises the product dimension correction manager:

determining if a plurality of items are handled in the actual container; and in response to determining that a plurality of items are handled in the actual container, for each of the plurality of items, incrementing a count representing a number of times that the item dimension values of the item stored in the memory have been considered suspect.

11. The system of claim 10, wherein during operation, if the count representing a number of times that the item dimension values of a given item of the plurality of items have been considered suspect exceeds a predetermined threshold, the product dimension correction manager initiates a measurement of the given item.

12. The system of claim 1, wherein said initiating correction of the at least one item dimension value stored in the memory comprises the product dimension correction manager replacing an initial value received from an item vendor with a measured value.

13. The system of claim 1, wherein said initiating correction of the at least one item dimension value comprises the product dimension correction manager:

determining if the dimensions of a given one of the one or more items was measured within a predetermined time period; and in response to determining that the given one of the one or more items was not measured within the predetermined time period, initiating a measurement of the given one of the one or more items.

14. A method, comprising:

performing by one or more computers:

receiving an indication of a recommended container that was recommended to collectively handle one or more items in a materials handling facility, wherein the indication of the recommended container comprises an identifier for the recommended container, and wherein the recommended container was selected dependent on item dimension values currently associated with each of the one or more items;

receiving a feedback indication of an actual container in which the one or more items were actually handled, wherein the feedback indication of the actual container comprises an identifier for the actual container;

comparing the identifier for the actual container to the identifier for the recommended container for a match to determine whether or not the recommended container was used to collectively handle the one or more items;

in response to the identifier for the actual container not matching the identifier for the recommended container based on said comparing, determining whether the one or more items were not handled in the recommended container because the recommended container was not appropriately sized; and initiating correction of at least one of the item dimension values associated with the one or more items in response to determining that the one or more items were not handled in the recommended container because the recommended container was not appropriately sized.

15. The method of claim 14, wherein said comparing the actual container to the recommended container comprises:
    calculating a volumetric utilization of the one or more items in the actual container;
    calculating a volumetric utilization of the one or more items in the recommended container; and
    comparing the values of the volumetric utilizations to see if they are equal.

16. The method of claim 14, wherein said determining comprises determining that the recommended container is larger than the actual container dependent on container dimension values associated with the recommended container and the actual container.

17. The method of claim 14, wherein said determining comprises determining that the recommended container is smaller than the actual container dependent on container dimension values associated with the recommended container and the actual container.

18. The method of claim 14, wherein said determining comprises determining that the recommended container was not available for handling the one or more items.

19. The method of claim 14, wherein said determining comprises receiving feedback indicating that the recommended container was too small to handle the one or more items, the recommended container was larger than necessary to handle the one or more items, or the recommended container was not available for handling the one or more items.

20. The method of claim 14, wherein said initiating correction comprises measuring at least one of the one or more items.

21. The method of claim 14, wherein said initiating correction comprises:
    determining if only one item is handled in the actual container; and
    in response to determining that only one item is handled in the actual container, incrementing a count representing a number of times that the dimensions currently associated with the one item have been considered suspect.

22. The method of claim 21, further comprising, in response to the count exceeding a predetermined threshold, measuring the one item.

23. The method of claim 14, wherein said initiating correction comprises:
    determining if a plurality of items are handled in the actual container; and
    in response to determining that a plurality of items are handled in the actual container, for each of the plurality of items, incrementing a count representing a number of times that the dimensions currently associated with the item have been considered suspect.

24. The method of claim 23, further comprising, in response to the count representing a number of times that the item dimension values of a given one of the plurality of items have been considered suspect exceeds a predetermined threshold, measuring the given one of the plurality of items.

25. The method of claim 14, wherein said initiating correction comprises:
    determining if the dimensions of the one or more items were measured within a predetermined time period; and
    in response to determining that at least one of the one or more items was not measured within the predetermined time period, measuring the at least one of the one or more items.

26. The method of claim 14, further comprising, prior to said receiving an indication of a container recommended to collectively handle one or more items, using the computer to perform associating initial item dimension values received from vendors of the one or more items with the one or more items in a table, database, or other data structure that stores item parameters, wherein the container is recommended dependent upon the initial item dimension values.

27. The method of claim 14, wherein said initiating correction comprises replacing an initial item dimension value with a measured value.

28. A method, comprising:
    performing by one or more computers:
        receiving a recommendation of a container for collectively handling one or more items in a materials handling facility, wherein the recommendation is dependent on item dimension values currently associated with each of the one or more items;
        scanning an identifier of each of the one or more items and an identifier of a container used to package the one or more items;
        providing feedback to initiate an update operation for a value of at least one item dimension value currently associated with at least one of the one or more items, wherein the feedback indicates the identifier of each of the one or more items, the identifier of the container used to package the one or more items, and whether the recommended container was of an inappropriate size for collectively handling the one or more items.

29. The method of claim 28, further comprising, prior to said initiating the update operation, using the one or more computers to perform determining that the item dimension values currently associated with the at least one of the one or more items are suspect.

30. The method of claim 29, wherein said determining comprises:
    determining if the at least one of the one or more items was measured within a predetermined time period;
    in response to determining that the at least one of the one or more items was not measured within the predetermined time period, incrementing a count associated with the at least one item indicating that the item dimension values currently associated with the at least one item are suspect; and
    in response to the count exceeding a predetermined threshold, measuring the at least one item.

31. The method of claim 29, wherein said determining comprises:
    determining if the at least one of the one or more items was measured within a predetermined time period; and
    in response to determining that the at least one of the one or more items was not measured within the predetermined time period, associating with the at least one item an indication that the item dimension values currently associated with the at least one item are suspect.

32. The method of claim 29, further comprising:
    measuring actual item dimension values of the at least one of the one or more items; and
    using the one or more computers to perform replacing the item dimension values currently associated with the at least one of the one or more items with the actual item dimension values if the item dimension values currently associated with the at least one of the one or more items are different from the actual item dimension values.

33. The method of claim 28, further comprising receiving item dimension values from one or more providers such that the item dimension values currently associated with each of the one or more items are item dimension values that were received from the one or more providers of the one or more items and that are currently associated with the one or more items in a table, database, or other data structure that stores item parameters.

34. A non-transitory computer-readable storage medium-storing program instructions that when executed on one or more computers cause the one or more computers to perform:
receiving an indication of a recommended container that was recommended to collectively handle one or more items in a materials handling facility, wherein the indication of the recommended container comprises an identifier for the recommended container, and wherein the recommended container was selected dependent on item dimension values currently associated with each of the one or more items;
receiving a feedback indication of an actual container in which the one or more items were actually handled, wherein the feedback indication of the actual container comprises an identifier for the actual container;
comparing the identifier for the actual container to the identifier for the recommended container for a match to determine whether or not the recommended container was used to collectively handle the one or more items;
in response to the identifier for the actual container not matching the identifier for the recommended container based on said comparing, determining whether the one or more items were not handled in the recommended container because the recommended container was not appropriately sized; and
initiating correction of at least one of the item dimension values associated with the one or more items in response to determining that the one or more items were not handled in the recommended container because the recommended container was not appropriately sized.

35. The storage medium of claim 34, wherein said comparing the actual container to the recommended container comprises:
calculating a volumetric utilization of the one or more items in the actual container;
calculating a volumetric utilization of the one or more items in the recommended container; and
comparing the values of the volumetric utilizations.

36. The storage medium of claim 34, wherein said determining comprises determining that the recommended container is larger than the actual container dependent on container dimension values associated with the recommended container and the actual container.

37. The storage medium of claim 34, wherein said determining comprises determining that the recommended container is smaller than the actual container dependent on container dimension values associated with the recommended container and the actual container.

38. The storage medium of claim 34, wherein said determining comprises determining that the recommended container was not available for handling the one or more items.

39. The storage medium of claim 34, wherein said determining comprises receiving feedback indicating that the recommended container was too small to handle the one or more items, the recommended container was larger than necessary to handle the one or more items, or the recommended container was not available for handling the one or more items.

40. The storage medium of claim 34, wherein said correcting comprises measuring at least one of the one or more items.

41. The storage medium of claim 34, wherein said initiating correction comprises:
determining if only one item is handled in the actual container; and
in response to determining that only one item is handled in the actual container, incrementing a count representing a number of times that the dimensions currently associated with the one item have been considered suspect.

42. The storage medium of claim 41, wherein when executed on the one or more computers, the computer-executable program instructions cause the one or more computers to perform, in response to the count exceeding a predetermined threshold, measuring the one item.

43. The storage medium of claim 34, wherein said initiating correction comprises:
determining if a plurality of items are handled in the actual container; and
in response to determining that a plurality of items are handled in the actual container, for each of the plurality of items, incrementing a count representing a number of times that the dimensions currently associated with the item have been considered suspect.

44. The storage medium of claim 43, wherein when executed on the one or more computers, the computer-executable program instructions cause the one or more computers to perform, in response to the count representing a number of times that the item dimension values associated with a given item have been considered suspect exceeds a predetermined threshold, measuring the given item.

45. The storage medium of claim 34, wherein said initiating correction comprises:
determining if the dimensions of the one or more items were measured within a predetermined time period; and
in response to determining that at least one of the one or more items was not measured within the predetermined time period, measuring the at least one of the one or more items.

46. The storage medium of claim 34, wherein when executed on the one or more computers, the computer-executable program instructions cause the one or more computers to perform, prior to said receiving an indication of a container recommended to collectively handle one or more items, associating initial item dimension values received from suppliers of the one or more items with the one or more items in a table, database, or other data structure that stores item parameters, wherein the container is recommended dependent upon the initial item dimension values.

47. The storage medium of claim 34, wherein said initiating correction comprises replacing an initial item dimension value with a measured value.

* * * * *